(12) United States Patent
Levy et al.

(10) Patent No.: US 11,203,314 B2
(45) Date of Patent: Dec. 21, 2021

(54) AUTOMATIC ACCIDENT DETECTION

(71) Applicant: Anagog Ltd., Tel Aviv (IL)

(72) Inventors: Gil Levy, Ramot Meir (IL); Yaron Aizenbud, Haifa (IL); Shlomi Lifshits, Tel Aviv (IL)

(73) Assignee: ANAGOG LTD., Tel Aviv (IL)

( * ) Notice: Subject to any disclaimer, the term of this patent is extended or adjusted under 35 U.S.C. 154(b) by 211 days.

(21) Appl. No.: 16/239,740

(22) Filed: Jan. 4, 2019

(65) Prior Publication Data

US 2019/0210548 A1 Jul. 11, 2019

Related U.S. Application Data

(60) Provisional application No. 62/614,016, filed on Jan. 5, 2018, provisional application No. 62/716,125, filed on Aug. 8, 2018.

(51) Int. Cl.

| | |
|---|---|
| *B60R 21/013* | (2006.01) |
| *G08G 1/00* | (2006.01) |
| *H04M 1/82* | (2006.01) |
| *H04M 1/56* | (2006.01) |
| *B60R 21/0134* | (2006.01) |

(52) U.S. Cl.
CPC ........ *B60R 21/013* (2013.01); *B60R 21/0134* (2013.01); *G08G 1/205* (2013.01); *H04M 1/56* (2013.01); *H04M 1/82* (2013.01); *H04M 2250/60* (2013.01)

(58) Field of Classification Search
CPC .. B60R 21/013; B60R 21/0134; G08G 1/205; H04M 1/56; H04M 1/82; H04M 2250/60
USPC ......................................................... 340/436
See application file for complete search history.

(56) References Cited

U.S. PATENT DOCUMENTS

| | | | |
|---|---|---|---|
| 2014/0052465 A1* | 2/2014 | Madan | G16H 40/60 705/2 |
| 2015/0254781 A1* | 9/2015 | Binion | G07C 5/085 701/32.2 |
| 2017/0221283 A1* | 8/2017 | Pal | B60R 25/24 |
| 2018/0070291 A1* | 3/2018 | Breaux | H04W 84/005 |
| 2019/0043273 A1* | 2/2019 | Cordova | B60W 40/09 |
| 2019/0244301 A1* | 8/2019 | Seth | G06Q 40/08 |

OTHER PUBLICATIONS

Sharma et al. S-Car Crash: Real-time Crash Detection Analysis and Emergency Aloert using Smarphone, Spe. 16, 2016. 2016 International Conference on Connected Vehicles and Expo (ICCVE), p. 36-42.*

* cited by examiner

*Primary Examiner* — Jack K Wang
(74) *Attorney, Agent, or Firm* — Tutunjian & Bitetto, P.C.

(57) ABSTRACT

A method, apparatus and product for automatic accident detection. The method comprising: obtaining readings from a mobile device of a user carried thereby and not affixed to a vehicle in which the user is riding; determining, based on the readings obtained from the mobile device, that the user is riding in the vehicle; obtaining data from the mobile device of the user; and determining automatically, based on the data obtained from the mobile device, that the vehicle was involved in an accident.

18 Claims, 11 Drawing Sheets

AUTOMATIC ACCIDENT DETECTION

CROSS-REFERENCE TO RELATED APPLICATION

This application claims the benefit of U.S. Provisional Application No. 62/614,016 filed Jan. 5, 2018, entitled "Automatic Accident and Collision Detection", and U.S. Provisional Application No. 62/716,125 filed Aug. 8, 2018, entitled "Automatic Accident and Collision Detection", which are hereby incorporated by reference in its entirety.

TECHNICAL FIELD

The present disclosure relates to automatic accident and collision detection in general, and to automatic accident and collision detection based on mobile devices input, in particular.

BACKGROUND

Accidents or traffic collisions are in a continuous growth due to the rapid growth of technology and infrastructure that has increased the traffic hazards and the distractors for drivers in the road. Accidents take place more frequently which causes huge loss of life and property. Once an accident occurs, it may be desired to reach the accident as fast as possible to provide rescue facilities.

The faster that an accident is detected and reported, the faster the response from emergency services may be provided, in place to save injured persons, and to handle the damages caused to property.

BRIEF SUMMARY

One exemplary embodiment of the disclosed subject matter is a method comprising: obtaining readings from a mobile device of a user, wherein the mobile device is being carried by the user, wherein the user is riding in a vehicle, wherein the mobile device is not affixed to the vehicle; determining, based on the readings obtained from the mobile device, that the user is riding in the vehicle; obtaining data from the mobile device of the user; and determining automatically, based on the data obtained from the mobile device, that the vehicle was involved in an accident.

Another exemplary embodiment of the disclosed subject matter is a non-transitory computer readable medium retaining program instructions, which program instructions when read by a processor, cause the processor to perform: obtaining readings from a mobile device of a user, wherein the mobile device is being carried by the user, wherein the user is riding in a vehicle, wherein the mobile device is not affixed to the vehicle; determining, based on the readings obtained from the mobile device, that the user is riding in the vehicle; obtaining data from the mobile device of the user; and determining automatically, based on the data obtained from the mobile device, that the vehicle was involved in an accident.

Yet another exemplary embodiment of the disclosed subject matter is an apparatus comprising: a processor and a memory, wherein the processor is configured to perform: obtaining readings from a mobile device of a user, wherein the mobile device is being carried by the user, wherein the user is riding in a vehicle, wherein the mobile device is not affixed to the vehicle; determining, based on the readings obtained from the mobile device, that the user is riding in the vehicle; obtaining data from the mobile device of the user; and determining automatically, based on the data obtained from the mobile device, that the vehicle was involved in an accident.

Optionally, said obtaining the data comprises obtaining a call log of the mobile device; wherein said determining automatically that the vehicle was involved in an accident comprises detecting a call pattern in the call log indicative of an occurrence of an accident.

Optionally, the call pattern is selected from the group consisting of: an outgoing call to a phone number of emergency services; an outgoing call to a phone number of an insurance company; a plurality of repeated calls to a phone number in a frequency higher than an average call attempt frequency of the user; and a plurality of outgoing calls and corresponding incoming calls to and from family members of the user, wherein a duration of the plurality of outgoing calls and corresponding incoming calls is below an average call duration of the user.

Optionally, identifying a phone call performed using the mobile device that was terminated abnormally, and determining a time of the accident based on a time of a termination of the phone call.

Optionally, said identifying the phone call is performed using a microphone of the mobile device and based on a recording of a last period of the phone call.

Optionally, said identifying the phone call is performed based on a call log of the mobile device, wherein said identifying comprises identifying a phone call with a participant having a duration below an average call duration of the user with respect to the participant.

Optionally, the mobile device comprising a sensor capable of sensing motion; wherein said determining automatically that the vehicle was involved in the accident comprises identifying a driving pattern of the vehicle that is consistent with a post-accident driving pattern.

Optionally, the mobile device comprising a sensor capable of sensing motion; wherein said determining automatically that the vehicle was involved in the accident comprises identifying a driving pattern of the vehicle in a road segment that deviates from an average driving pattern of vehicles in the road segment.

Optionally, the mobile device comprising a sensor capable of sensing motion; wherein said determining automatically that the vehicle was involved in an accident comprises: identifying a mobility state of the user, based on readings of the sensor, indicative of the user not riding the vehicle.

Optionally, the mobile device comprising a sensor capable of sensing motion; wherein said determining automatically that the vehicle was involved in an accident comprises: identifying a mobility pattern of the user comprising an ordinal sequence of mobility states of the user, wherein the mobility pattern is indicative of the user being involved with the accident.

Optionally, the mobility pattern comprises at least a sequence of a first mobility state indicative of the user riding a vehicle, a second mobility state, immediately following the first mobility state, indicative of a sudden stop; and a third mobility state occurring after the second mobility state, indicative of a user walking.

Optionally, said determining automatically that the vehicle was involved in an accident is performed at least a predetermined time after the accident, wherein said determining is performed based on a lack of matching between scheduled activities of the user, as appearing in a calendar of the user that is retained in the mobile device, and actual activities of the user.

Optionally, the data obtained from the mobile device is one or more pictures taken by the mobile device, wherein said determining automatically that the vehicle was involved in an accident is performed based on identifying in the one or more pictures a damaged vehicle or portion thereof.

Optionally, automatically determining, based on the one or more pictures, an estimated severity level of the accident.

Optionally, automatically identifying in the one or more pictures, a license plate of a vehicle, and determining one or more involved vehicles in the accident.

Optionally, the mobile device comprising a microphone, wherein said obtaining data comprises obtaining a recording of the microphone, wherein said determining automatically that the vehicle was involved in an accident comprises analyzing the recording to identify an audio segment indicative of the accident.

Optionally, the mobile device retaining a plurality of applications, wherein said obtaining data comprises obtaining a usage information of the plurality of applications, wherein said determining automatically that the vehicle was involved in an accident comprises analyzing the usage information of the plurality of applications.

Optionally, in response to said determining automatically that the vehicle was involved in an accident, automatically reporting the accident to a third party.

Optionally, in response to said determining automatically that the vehicle was involved in an accident, automatically updating a calendar of the user, wherein the calendar is retained in the mobile device.

Optionally, said determining automatically that the vehicle was involved in the accident comprises extracting a feature vector from the data, wherein the feature vector is associated with a sliding window with respect to a sensor of the mobile device.

Optionally, the mobile device comprising an accelerometer, wherein said obtaining the readings comprises obtaining accelerometer readings from the accelerometer, wherein said determining that the user is riding in the vehicle comprises analyzing the accelerometer readings of the mobile device to determine mobility state of the user.

Optionally, obtaining data from a computing device of the vehicle; wherein said determining automatically that the vehicle was involved in an accident, is further determined based on the data obtained from the computing device.

Optionally, performing an authentication of said determining automatically that the vehicle was involved in an accident, based on the data obtained from the computing device.

Optionally, the data obtained from the computing device of the vehicle comprises one or more pictures captured by a dash camera of the vehicle; wherein said determining automatically that the vehicle was involved in an accident is performed based on analysis of the one or more pictures.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
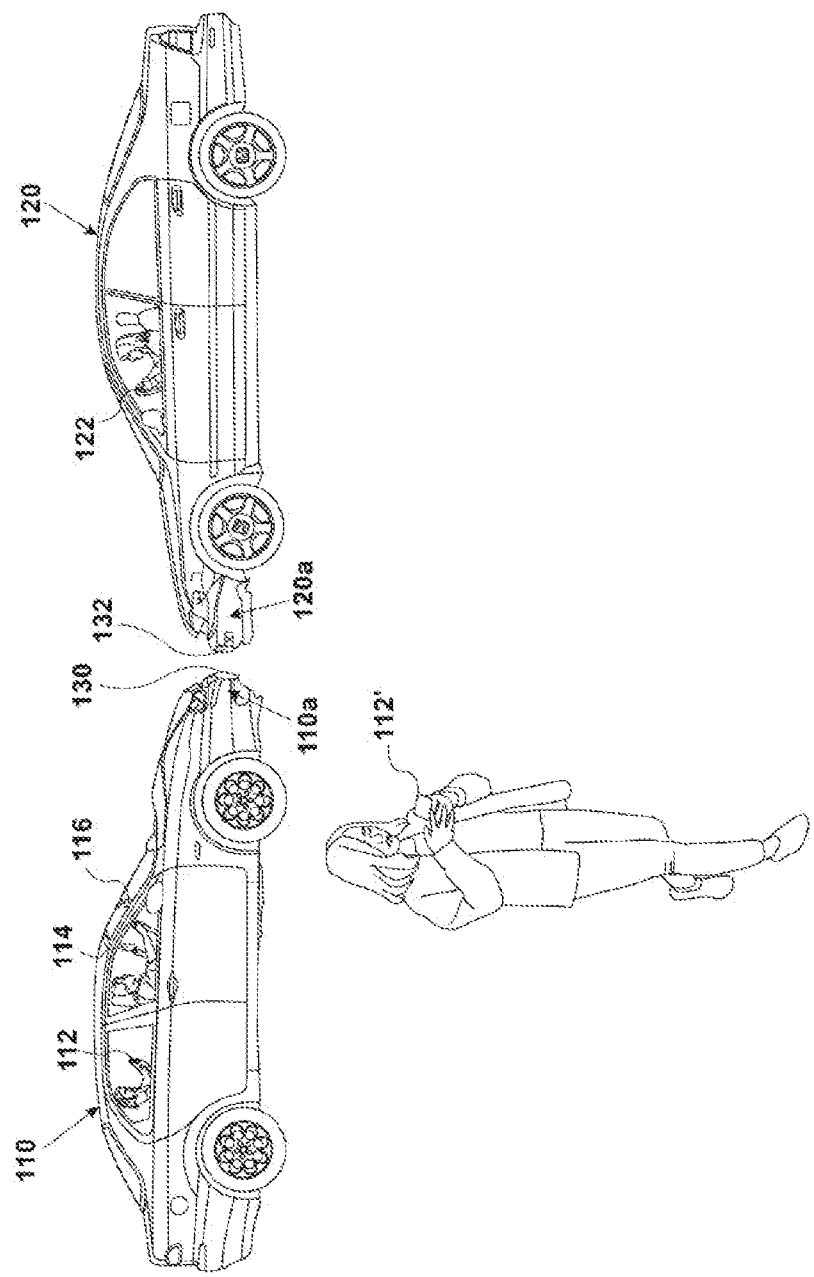
FIG. 1 shows a schematic illustration of an exemplary vehicle accident, in accordance with some exemplary embodiments of the disclosed subject matter.

One technical problem dealt with by the disclosed subject matter is to automatically detect that a vehicle is involved with an accident. The high demand of automobiles has also increased the traffic hazards and road accidents. The faster an accident is detected and reported, the better it may be handled. As an example, an effective automatic accident detection and information provider may be required in place to save injured persons, by allowing faster response from emergency services.

Additionally or alternatively, an automatic vehicle accident detection may provide wider and more efficient information regarding the accident that may be required for both of the emergency services and to users affected directly or indirectly from the accident, such as geographical coordinates, time and angle in which a vehicle accident had occurred, people associated with the accident, or the like. On the one hand, alert messages may be sent to rescue teams in a short time, which will help in saving the valuable lives. On the other hand, alert messages may be sent to relevant people associated with people involved with the accident, that may not usually be alerted of such accidents, such as people that their schedule may be affected by the accident, family, friends, insurance agents, or the like.

One technical solution is to automatically determine, based on data obtained from mobile devices carried by users riding a vehicle, that the vehicle was involved in an accident. In some exemplary embodiments, existing computing capabilities, sensors and tools of such computing devices, may be utilized to determine that the vehicle is involved in an accident. As most people today, carry computing devices such as smart phones or other portables devices, the solution may be to automatically detect that a vehicle is involved in an accident based on data provided from computing devices of users associated with the vehicle, such as a driver, passengers, drivers of adjacent vehicles, or the like.

Another technical solution is to determine that the vehicle is involved in an accident, based on a behavior pattern of users of the mobile device associated with the vehicle, with respect to their mobile devices. In some exemplary embodiments, when a vehicle is involved in an accident, drivers, passengers, pedestrians or the like, involved in the accident, may tend to behave in a common behavior. Additionally or alternatively, the behavior of other drivers in the area of the accident, with respect to their computing device, may be indicative of the accident.

In some exemplary embodiments, the data may be obtained from a mobile device carried by a user, while the user is riding in the vehicle. It may be appreciated that the mobile device may not be affixed to the vehicle.

In some exemplary embodiments, prior to obtaining the data from the mobile device to determine involvement in an accident, a determination whether the user of the mobile device is riding the vehicle may be performed based on readings obtained from the mobile device. As an example, a mobility state of the user may be determined based on readings of an accelerometer of the computing device. Thus, if the user is riding a vehicle, the speed of the associated mobile device may be that of the vehicle. However, if the mobile device is with the user as s/he walks either to or from the car, the speed may be slower.

In some exemplary embodiments, when a small accident occurs, the driver may stop the vehicle, then drive or move it to the side of the road. The driver or the passengers of the vehicle may go outside the car and take a picture of the damage using their smartphones, mobile device cameras, or the like. The driver or the passengers of the vehicle may perform phone calls to relatives, an insurance company, to the police, to medical help, to any other service provider, or the like. Such behaviors may be indicative that an accident has occurred.

In some exemplary embodiments, the data obtained from the mobile device of the user may be obtained from a sensor of the mobile device that is capable of sensing motion. The data obtained from such sensor may be analyzed to determine the pattern of motion that the mobile device is being carried on, such as the pattern of driving of the vehicle that the user holding the mobile device is riding, a mobility state of the user, a mobility pattern of the user, or the like. The system may be configured to determine automatically that the vehicle was involved in the accident, based on identifying a driving pattern of the vehicle that is consistent with a post-accident driving pattern. Additionally or alternatively, the system may be configured to determine automatically that the vehicle was involved in the accident, based on identifying a driving pattern of the vehicle in a road segment that deviates from an average driving pattern of vehicles in the road segment.

In some exemplary embodiments, a driving pattern of vehicles in the area of the accident may be indicative thereof. As an example, when an accident occurs, vehicles driven in the area of the accident may stop or slow down to see what happened, then return to their normal driving habits. As another example, a congestion of traffic may occur at that area, indicating that an accident has occurred. As yet another examples, such vehicles may slow down and veer to the sideway of the street, to vacate the road to the emergency services vehicles. Additionally or alternatively, users associated with the accident, such the driver, passenger of the vehicle, or the like, may have a common mobility behaviour pattern consequent upon the accident. As an example, the users may be in a driving mode before the accident occurs, then they may stop and walk outside the vehicle to check out the damage, or the like.

Additionally or alternatively, the driving pattern of a vehicle being different than the driving pattern of other vehicles in the same area or the same route, may be indicative of the vehicle being involved with an accident. As an example, a vehicle involved in an accident may stop in a road while other vehicles are driving. As another example, a vehicle involved in an accident may stop and cause a traffic congestion behind thereof.

In some exemplary embodiments, a mobility state of the user of the mobile device may be determined based on readings of one or more motion sensors. The mobility state may be checked to determine if it is indicative of the user not riding the vehicle. Such may be an unexpected indication of being involved in an accident. If the user is not riding the vehicle, after being riding vehicle based on the readings of the mobile device, this may be indicative that the user had to get off the car suddenly, such as to check the vehicle, the exchange information with the second party, or the like.

Additionally or alternatively, a mobility pattern of the user may be identified based on the data obtained from the motion sensors. The mobility pattern may comprise an ordinal sequence of mobility states of the user. The mobility pattern may be analyzed to determine if it is indicative of the user being involved with the accident. As an example, a mobility pattern comprising a sequence of a first mobility state indicative of the user riding a vehicle, a second mobility state, immediately following the first mobility state, indicative of a sudden stop; and a third mobility state occurring after the second mobility state, indicative of a user walking; may be indicative of the vehicle being involved in an accident. It may be appreciated, that the driving pattern of the vehicles, the mobility pattern of the users, or the like, may be automatically determined by analyzing, in real time, the speed and or locations of vehicles on the location, based on data obtained from computing devices associated with the vehicles.

Additionally or alternatively, the mobility pattern may be automatically determined based on data obtained from other sensors of such mobile devices. As an example, indicating that the user is leaving the vehicle may be performed based determining that the user is walking. Determining that the user is walking may be performed based on data retrieved from the accelerometer of the computing device. As another example, indicating that the user is leaving the vehicle may be performed based on detecting that the charger of the mobile device has been disconnected, by detecting that the signal strength of the Bluetooth or other wireless connection to a device in the vehicle (e.g., wireless or Bluetooth device in the car) weakens, or the like. As yet another example, using the barometer readings of the device it is possible to "feel" the barometric pressure change between the car and the outside environment and thus understanding that the device or the user is inside the vehicle or went outside the vehicle.

In some exemplary embodiments, users associated with the accident, such the driver, passenger of the vehicle, or the like, may have a common phone call behaviour pattern consequent upon the accident. As an example, the users may stop a call due to the accident, may perform calls to emergency services, may perform calls to certain family members telling that they have been involved in an accident, or the like. In some exemplary embodiments, the data obtained from the computing device may comprise a call log of the mobile device. The call log may be analyzed to determine an indication of an occurrence of an accident, such as an outgoing call to a phone number of emergency services, an outgoing call to a phone number of an insurance company, a plurality of repeated calls to a phone number in a frequency higher than an average call attempt frequency of the user, a plurality of outgoing calls and corresponding incoming calls to and from family members of the user with a duration below an average call duration of the user, or the like.

In some exemplary embodiments, a phone call performed using the mobile device that was terminated abnormally may be identified, such as based on a recording of a last period of the phone call, based on an input from a microphone of the mobile device, based on the call log comprising a phone call with a participant having a duration below an average call duration of the user with respect to the participant, or the like. The information about the abnormally terminated phone call, such as the termination time, duration, or the like, may be analyzed to determining a time of the accident.

In some exemplary embodiments, after an accident occurs, the user may attempt to call a destination, and may repeat the call in a high frequency. In some cases, the call frequency to the same destination may be higher than an average call-attempt frequency of the user, either generally to all number, specifically to the second participant of the phone calls, or the like. Additionally or alternatively, the call frequency may be in a relatively high percentile of the call-attempt frequency, such as above 75%, above 80%, or the like. Additionally or alternatively, the calls may be relatively short, such as below an absolute threshold, below a relative threshold (e.g., 10% percentile of the user), or the like. Additionally or alternatively, the destination may call back to the user in multiple attempts. Consider a mother who receives a call from her son notifying her he was involved in an accident. The mother may call her son over and over in a relatively high frequency (e.g., above her regular frequency, above her regular frequency as observed in the user's call log, in a relatively high percentile of her call back frequency (e.g., 75%, 80%, 90%, or the like).

In some exemplary embodiments, when a driver is involved in an accident, such an event may disrupt the driver's overall regular timeline. Events she is involved with in may change with respect to the regular schedule. As an example, the driver may cancel or miss calendar events, may arrive later to her next destination, may arrive home after work later than usual, or the like. Such changes may be indicative of an unexpected event such as an accident. In some exemplary embodiments, the determination that the vehicle was involved in an accident may be performed at least a predetermined time after the accident, such as after few hours, at the end of the day, a day after, or the like. The determination may be performed based on a lack of matching between scheduled activities of the user, as appearing in a calendar of the user that is retained in the mobile device, and actual activities of the user. The lack of matching may be indicative of a sudden event that prevented the user from fulfilling her scheduled activities. Along with the additional data obtained from the mobile device, indicating that the user was riding the vehicle, the involvement in the accident, along with additional information related thereto, may be determined.

In some exemplary embodiments, the behavior pattern may be automatically determined based on data obtained from applications, background services, or the like, that are installed on computing devices of users, such as the driver of the vehicle, passengers on the vehicle, passengers of other vehicles in the area, pedestrians in the area, or the like. The driver or passengers of vehicles involved with the accident, may invoke certain apps indicative of the accident, such as an insurance app, browsing specific web pages, or the like.

In some exemplary embodiments, the data obtained from the mobile device may comprise one or more pictures taken by the mobile device. The one or more pictures may be analyzed to determine an estimated severity level of the accident. As an example, the images may be analyzed to identify a damaged vehicle or portion thereof, and determine the severity of the accident based on the severity of the damage. Additionally or alternatively, additional data may be extracted from the pictures, such as determining involved vehicles in the accident based on identified license plates of vehicles in the pictures, or the like.

Additionally or alternatively, apps or background services running on computing devices may be configured to detect that a camera of the computing device was turned on, switched, that a new photo was added to the device memory, or the like. Recent or newly added photos may be analyzed automatically to detect if a vehicle appears in the photo. The photos may be analyzed to automatically detect if the photo comprises a vehicle, a part of a vehicle, a damaged part of a vehicle, or the like. Image analysis tools, object recognition tools, or the like, may be utilized to determine the type of damage caused to the vehicle, location of damage, or the like. A picture classifier may be utilized to determine automatically the type of the car, severity of accident, plate number, or the like. Such data may be utilized in order to understand if there was an accident, how severe is the accident, associating between the vehicle of the owner thereof (e.g., by identifying the plate number, type of the car, color, or the like), or the like. Additionally or alternatively, such classifier may be used to detect the severity and details of the other involved party in the accident, such as other vehicles, pedestrian, or the like. In some cases, information extracted automatically based on the photos may be used to automatically fill accident details in a report or digital record, such as records of emergency services, records of insurance, or the like. It may be appreciated that different parameters of the behavior pattern may be automatically determined based on data obtained from a camera of the computing device. As an example, it may be possible to see that other vehicles or objects are moving while the vehicle is not moving and this way to understand that the car is stuck for some reason.

Additionally or alternatively, the behavior pattern may be automatically determined based on data obtained from voice sensors of the mobile device. As an example, apps or background service may be configured to detect that a phone call was disconnected suddenly, that a shout or a siren has been heard through the microphone, that a call has been placed to relatives or emergency services or any other kind of service provider that is related to such an event, or the like. As another example, using the microphone it may be possible to hear the vehicle hitting or getting hit by another object, shouts of the driver or passenger, the vehicle door opening closing, or the like.

In some exemplary embodiments, a car dash camera may be installed in the vehicle. In some cases, the car dash camera may record in relatively short intervals videos indicative of the road (e.g., front view, side view, back view, or the like). In some cases, a mobile device may function as a car dash camera or may be connectable thereto. The videos may be reviewed to automatically detect the accident, identify information relating to the accident, or the like. In some cases, information from the car dash camera may be reviewed in real-time consistently. Additionally or alternatively, video from the car dash camera may be reviewed only after a potential accident event is detected and used to validate the event or refute it. In such a case, computation and power resources are utilized in a more efficient manner and computational-intense processing is performed after initial indication of existence of an event is detected.

In some exemplary embodiments, various sensor readings of the mobile device may be gathered and a feature vector may be extracted therefrom. The feature vector may represent sensor readings in a sliding window with respect to some of the sensors (e.g., last one minute of accelerometer readings). Additionally or alternatively, the feature vector may represent a true/false indication of an event, e.g., a loud sound was heard in the last 60 minutes, or the like. In some exemplary embodiments, a reading of the same sensor may be provided to different time windows which may or may not overlap. As an example, accelerometer information may be provided for 60 windows, each of which of 10 seconds.

In some exemplary embodiments, a classifier may be utilized to determine, based on the feature vector, that an accident has occurred. The classifier may be trained using training data. The classifier may be a global model generated based on behavior of many people or an individual model of an individual person behavior. In some exemplary embodiments, cluster of users may be compiled, and for each cluster a model may be trained, thereby providing a model useful for "look-a-like" users that behave in a similar manner.

In some exemplary embodiments, the training data may be obtained using data on accidents from third party sources, such as incidents information services like Waze™ or Google™ maps or information from service providers such as insurance companies or car manufacturers call centers, or the like. The data may be used to obtain a label and correlate the label with a feature vector that is obtained from the third party source or obtained using an agent installed on the device, or the like. As an example, an agent may monitor behavior of the user and the information about the accident may be obtained from the user's insurance company. Using such information, the behavior of the user at the time of the accident may be obtained from the agent's log. In some cases, the precise timing may not be known. GPS and location information may be used to determine when the user was located at or near the place of the accident, and anomaly detection may be used to identify the timeframe in which the user acted abnormally to identify when exactly the accident occurred.

In some exemplary embodiments, a confidence level parameter may be attached to the accident event. As presented above, the event of accident is a set of variety of indications from different sources. Therefore, the confidence level may be gradually increased if more indication is accumulated until it reaches a predefine threshold. A machine learning algorithm may be used to learn the correlation between any physical or virtual (such as web browsing, app launching, or the like) indications, to the occurrence of an accident; in order to automatically classify an accident event.

One technical effect of utilizing the disclosed subject matter is to enable a fast and effective response to road accidents. The disclosed subject matter provides an automatic detection and report of accidents, while providing accurate information about the accidents to the emergency service, such as exact location, severity of the accident, the damage caused by the accident, or the like. The detection and the notification of the accidents are performed automatically using tools existing in mobile devices that are carried by everyone. Comparing with existing accident detection and notification approaches, that may be expensive, maintenance complex task, and not available in all vehicles, the disclosed subject matter utilizes the processing power and technology of mobile devices that are available to all drivers and passengers.

Another technical effect of utilizing the disclosed subject matter is to provide an automatic accident detection without requiring any special activity from the user. The disclosed subject matter enables detection of the accident based on data from mobile device that may be obtained and analyzed automatically without explicit input or action from the user.

Yet, another technical effect of utilizing the disclosed subject matter is to enable an ex post facto detection of accidents. Small accidents, or low severity accidents may not always be required to be reported to emergency services or family members. However, such accident may be required to be detected and reported, even after the accident occurs, such as to be reported to insurance services, to update schedules based there upon, or the like. The disclosed subject matter enables to automatically determine that a vehicle was involved in an accident, a predetermined time after the accident occurred, such as after few hours or a day or the like, even while not having the real time data of the accident. After the accident being detected, additional information about the accident may be automatically and retroactively extracted based on logs of the mobile device.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1 showing a schematic illustration of an exemplary vehicle accident, in accordance with some exemplary embodiments of the disclosed subject matter.

In some exemplary embodiments, FIG. 1 may show a schematic illustration of an exemplary vehicle accident occurred between Vehicle 110 and Vehicle 120. The vehicle accident may be automatically determined based on data obtained from one or more mobile devices associated with the vehicles involved in the accident, such as Mobile Device 114 of a driver of Vehicle 110, Mobile Device 112 of a passenger in Vehicle 110, Mobile Device 122 of a driver of Vehicle 120, or the like. Additionally or alternatively, the vehicle accident may be automatically determined based on data obtained from one or more computing devices of the vehicles involved in the accident, such as Dash Camera 116, or the like. Additionally or alternatively, Vehicle 110 may be an autonomous car, and the data may be provided by a computer system of Vehicle 110.

In some exemplary embodiments, Mobile Device 112 may be carried by a user, such as a passenger or a driver riding in Vehicle 110. Mobile Device 112 may be not be affixed to the vehicle. Mobile Device 112 may comprise an accelerometer capable of sensing the acceleration of Mobile Device 112, other motion sensors such as speedometer, barometer, or the like. Readings from Mobile Device 112 may be obtained. The readings may comprise accelerometer readings from the accelerometer, readings from the other motions sensors, locations readings for apps of Mobile Device 112, or the like. The readings may be analyzed to determine mobility state of the user. Based on mobility state of the user, the user may be determined to be riding in Vehicle 110. As an example, based on an acceleration reading of Mobile Device 112 indicating that the user is in a driving mobility state, the user may be determined to be riding in Vehicle 110.

In some exemplary embodiments, data may be obtained from Mobile Device 112, Mobile Device 114, or the like. The data may comprise a call log of Mobile Device 112 (or of each mobile device), data from a sensor capable of sensing motion of, audio recordings from a microphone of Mobile Device 112, pictures captured by Mobile Device 112, usage information of applications of Mobile Device 112, recordings of phone calls of Mobile Device 112 (e.g., from recordings apps), or the like. The data may be analyzed to identify a motif, a pattern of behavior, or the like that may be indicative of the occurrence of the accident. As one example, the call log data may be analyzed to detect a call pattern indicative of an occurrence of an accident, such as an outgoing call from Mobile Device 112 to a phone number of emergency services, an outgoing call from Mobile Device 112 to a phone number of an insurance company, a plurality of repeated calls to a phone number in a frequency higher than an average call attempt frequency of the user of Mobile Device 112 to this phone number, a plurality of repeated calls to a phone number in a frequency higher than an average call attempt frequency of the user of Mobile Device 112 to all numbers, a plurality of outgoing calls and corresponding incoming calls to and from family members with a duration below an average call duration of the user of Mobile Device 112, or the like. As another example, the call log data and the audio recordings may be analyzed to identify a phone call performed using Mobile Device 112 that was terminated abnormally, and determining a time of the accident based on a time of a termination of the phone call. As yet another example, the usage information of applications of Mobile Device 112 may be analyzed to determine if Vehicle 110 was involved in an accident, such as based on accessing insurance applications, publishing the accident in social networks, or the like.

In some exemplary embodiments, motion data, such as data obtained from sensors of Mobile Device 112 capable of sensing motion may be analyzed to determine a driving pattern of Vehicle 110. The driving pattern of Vehicle 110 may be analyzed to determine if being consistent with a post-accident driving pattern. Additionally or alternatively, the driving pattern of Vehicle 110 in the road segment of the vehicle may be compared with the driving pattern of other vehicles in the same road segment. If the driving pattern of Vehicle 110 deviate from an average driving pattern of vehicles in the same road segment, and accident may be indicated.

Additionally or alternatively, a mobility state of the user of Mobile Device 112 may be determined based on readings of the motion sensors thereof. A mobility state indicative of the user not riding Vehicle 110, (e.g., as in Mobile Device 112'), after already indicating the user was riding Vehicle 110 (e.g., as in Mobile Device 112), may be indicative of an accident. The user may be expected to get off Vehicle 110, such as to take pictures of the accident, to exchange information with the driver of the other vehicle, or the like. Thus, a walking mobility state may be indicative of Vehicle 110 being involved in an accident. In some exemplary embodiments, the data may be analyzed to determine a mobility pattern of the user of Mobile Device 112 (112'). The mobility pattern comprise an ordinal sequence of mobility states of the user. Some mobility patterns may be indicative of the user being involved with the accident. As an example, a mobility pattern comprising a sequence of a first mobility state indicative of the user riding a vehicle (e.g. based on data from Mobile Device 112, indicating that the user is riding Vehicle 110); a second mobility state, immediately following the first mobility state, indicative of a sudden stop (e.g. based on data from Mobile Device 112); and a third mobility state occurring after the second mobility state, indicative of a user walking (e.g. based on data from Mobile Device 112'), may be indicative of the user being involved in the accident.

Additionally or alternatively, the driving pattern may be utilized to determine the circumstances led to the accident, the vehicle responsible of the accident, or the like. As an example, the driving pattern may be indicative of uncircumspect driving, driving in a higher speed, a deviation from the expected path, or the like.

In some exemplary embodiments, the obtained data may comprise one or more pictures taken by Mobile Device 112' (e.g., Mobile Device 112 carried by the user after getting off Vehicle 110). The one or more pictures may be analyzed to detect a damaged portion of Vehicle 110 such as Hit 110a, a damaged portion of Vehicle 120 such as Hit 120a, or the like. Such motifs may be indicative of an accident. An estimated severity of the accident may be determined based on the pictures, such as based on the scope of Hit 110a and Hit 120a, the severity thereof, or the like. Additionally or alternatively, a License Plate 130 of Vehicle 110 or License Plate 132 of Vehicle 120, may be detected in the pictures to determine the involved vehicles in the accident. Additionally or alternatively, the pictures may be provided as additional information about the accident, such as for insurance issues, police reports, or the like.

In some exemplary embodiments, pictures and records of Dash Camera 116 of Vehicle 110 may be analyzed. Dash Camera 116 may be configured record videos indicative of the road (e.g., front view, side view, back view, or the like). Dash Camera 116 may be configured record videos in relatively short intervals, such as of 10 seconds, 20 seconds, or the like. In some cases, Mobile Device 112 may be connectable to Dash Camera 116, and the data provided by Dash Camera 116 may be obtainable from Mobile Device 112. Videos and pictures provided by Dash Camera 116 may be reviewed to automatically detect the accident, identify information relating to the accident, or the like. In some cases, information from Dash Camera 116 may be reviewed in real-time consistently. Additionally or alternatively, video from Dash Camera 116 may be reviewed only after a potential accident event is detected and used to validate the event or refute it. In such a case, computation and power resources are utilized in a more efficient manner and computational-intense processing is performed after initial indication of existence of an event is detected.

Referring now to FIGS. 2A-2D showing a schematic illustration of an exemplary movement pattern of a vehicle involved in an accident, in accordance with some exemplary embodiments of the disclosed subject matter.

In some exemplary embodiments, the driving pattern illustrated in FIGS. 2A-2D may be indicative of an accident.

Figure 2A:
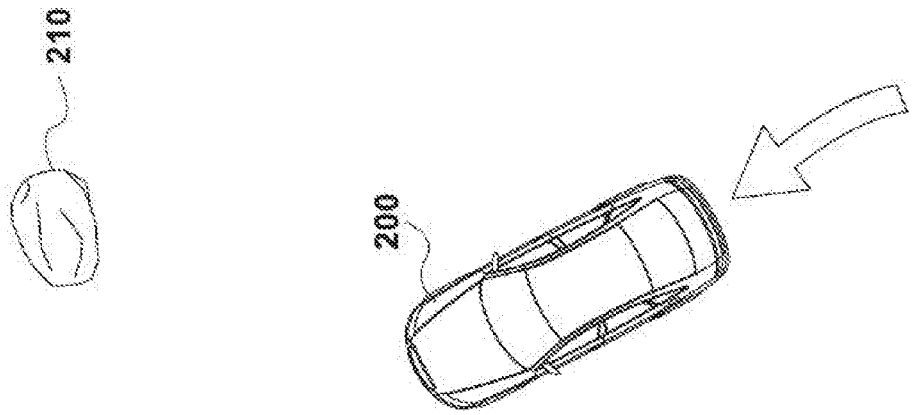
FIGS. 2A-2D show schematic illustrations of exemplary movement patterns of a vehicle involved in an accident, in accordance with some exemplary embodiments of the disclosed subject matter.

In FIG. 2A, Vehicle 200 may be driving straight towards an Obstacle 210. Obstacle 210 may be another vehicle, a stone, a wall, or the like. The mobility state determined based on mobile devices temporary associated with Vehicle 200 may indicate a state of driving forward. The mobility state may be determined based on accelerometer readings of the mobile devices temporary associated with Vehicle 200, or based on readings of other sensors thereof, such as speedometer readings, barometer readings, combination thereof, or the like.

Figure 2B:
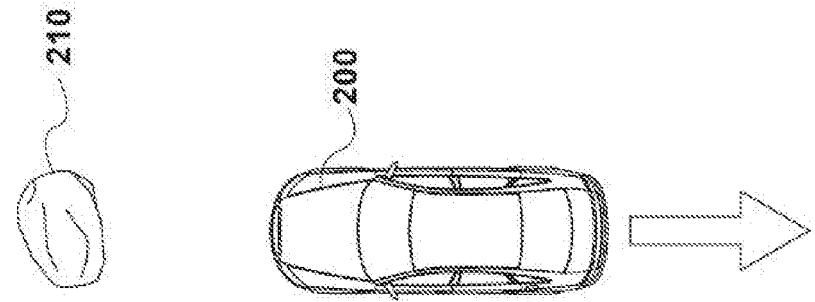

In FIG. 2B, Vehicle 200 may hit Obstacle 210. As a result, the mobility state of users riding in Vehicle 200 may indicate a sudden stop.

Figure 2C:
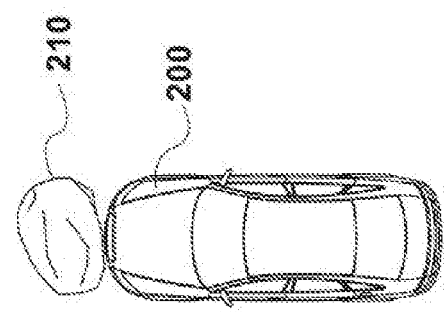

In FIG. 2C, the readings may indicate that Vehicle 200 is driving backward. Such state may be determined based on negative accelerometer readings (of opposite direction of the readings of FIG. 2A), based on readings of a gyroscope of the mobile device, magnetometer readings, combination thereof, or the like.

Figure 2D:
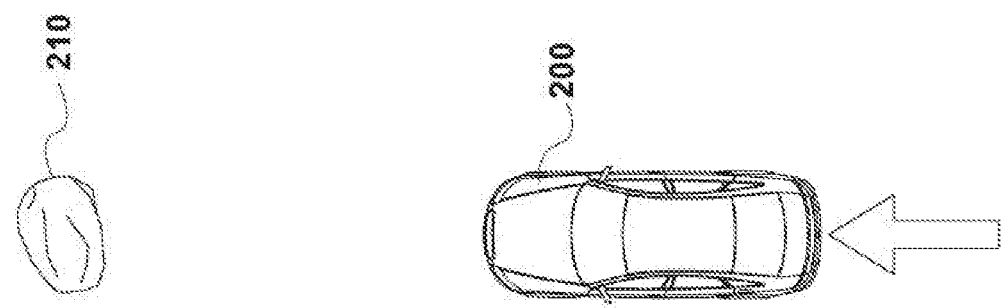

In FIG. 2D, the readings obtained from the mobile device may indicate that Vehicle 200 turned to the right, e.g., to stop at the side of the road.

Figure 3A:
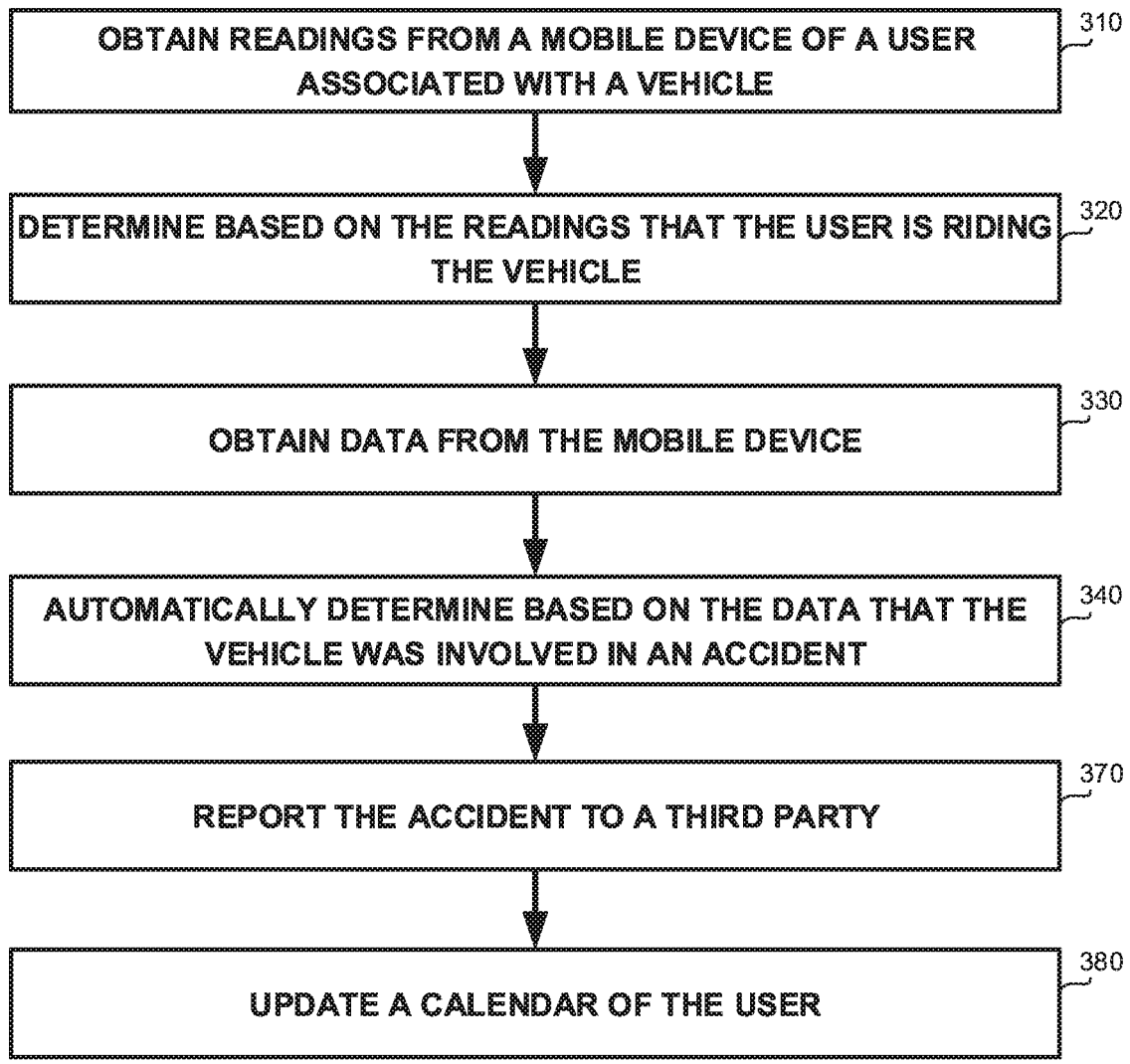
FIGS. 3A-3H show flowchart diagrams of a method, in accordance with some exemplary embodiments of the disclosed subject matter.

Referring now to FIG. 3A showing a flowchart diagram of a method, in accordance with some exemplary embodiments of the disclosed subject matter.

On Step 310, readings from a mobile device of a user associated with a vehicle may be obtained. In some exemplary embodiments, the mobile device may be temporary associated with the vehicle. The mobile device may be carried by the user while the user is riding in the vehicle. However, the mobile device may not affixed to the vehicle.

In some exemplary embodiments, the user may be a driver of the vehicle, a passenger in the vehicle, a passenger of an adjacent vehicle, or the like.

In some exemplary embodiments, the mobile device may comprise an accelerometer. The accelerometers may be configured to be used for user interface control, such as for view adjustment, as pedometers, in conjunction with specialized applications, or the like. The accelerometer may be configured to measure proper acceleration of the mobile device, e.g., the rate of change of velocity of the mobile device in its own instantaneous rest frame. Readings of the accelerometer of the mobile device may be obtained.

On Step 320, a determination that the user is riding in the vehicle may be performed based on the readings obtained from the mobile device.

In some exemplary embodiments, the accelerometer readings may be analyzed to determine a mobility state of the user. The accelerometer readings may vary according to the user's motion (i.e. walking, running, driving, riding a bike, sleeping, or the like). As an example, the user may be determined to be riding in the vehicle based on the accelerometer readings of the mobile device to determine mobility state of the user.

It may be appreciated that while most mobile devices are equipped with a GPS from which it is possible to determine the speed at which the device is moving, the GPS consumes much more power than the accelerometer. Accordingly, using accelerometer data may more be economical when it is necessary to constantly monitor the mobility status and may be available when the GPS is not.

In accordance with a preferred embodiment of the present invention, the mobility status of a mobile device may be determined using the statistical characteristics of the accelerometer readings. For example, a driving pattern may be classified and distinguished from other activities by detecting constant constraint vibrations occurring while driving compared to abrupt accelerations when walking or running or very low acceleration when the mobile device is not moving.

On Step 330, data may be obtained from the mobile device of the user. In some exemplary embodiments, the data may comprise variant types of data, such as data about apps consuming, call log data, photos, data from a microphone of the mobile device, accelerometer readings, barometer readings, GPS readings, data from sensors of the mobile device or the like.

On Step 340, an involvement of the vehicle in an accident may automatically be determined, based on the data obtained from the mobile device.

As an example, the data obtained in Step 330 may comprise a recording of a microphone of the mobile device. The recording may be analyzed to identify an audio segment indicative of the accident, such as an accident voice, a boom, a crash, a screaming, curses, or the like. In some exemplary embodiments, the recordings may be compared with recordings of other segments to identify an abnormal vocal behavior of the user, such as anger, excitement, or the like.

In some exemplary embodiments, a feature vector may be extracted from the data obtained from the mobile device. Each feature may be representing a piece of data from a different sensor of the mobile device, different types of data, or the like. The feature vector may represent sensor readings in a sliding window with respect to some of the sensors, such as a last one minute of accelerometer readings, last two minutes of accelerometer readings, or the like. Additionally or alternatively, the feature vector may represent a true/false indication of an event, e.g., a loud sound was heard in the last 60 minutes, a hit was detected in the pictures, or the like. In some exemplary embodiments, a reading of the same sensor may be provided to different time windows which may or may not overlap. For example, accelerometer information may be provided for 60 windows, each of which of 10 seconds.

In some exemplary embodiments, the feature vector may be used with a classifier implemented on a server or other device having a processor. The classifier may be used to predict a label for the feature vector, such as the label of accident. In some exemplary embodiments, the classifier may be trained using training data. The classifier may be a global model based on behavior of many people or an individual model of an individual person behavior. In some exemplary embodiments, cluster of users may be compiled, and for each cluster a model may be trained, thereby providing a model useful for "look-a-like" users that behave in a similar manner.

On Step 370, the accident may be reported to a third party, such as rescue services, insurance companies, family member, social network contacts, or the like. In some exemplary embodiments, the report may comprise the time of the accident, information about the accident, pictures, or the like, based on the data obtained from the mobile device.

On Step 380, a calendar of the user may be updated based on the occurrence of the accident. In some exemplary embodiments, the calendar may be retained in the mobile device of the user. Additionally or alternatively, the calendar may be accessible from the mobile device. As an example, the calendar may be updated to delay events that the user may arrive late thereto, send cancelation messages to participants of such events, or the like.

Figure 3B:
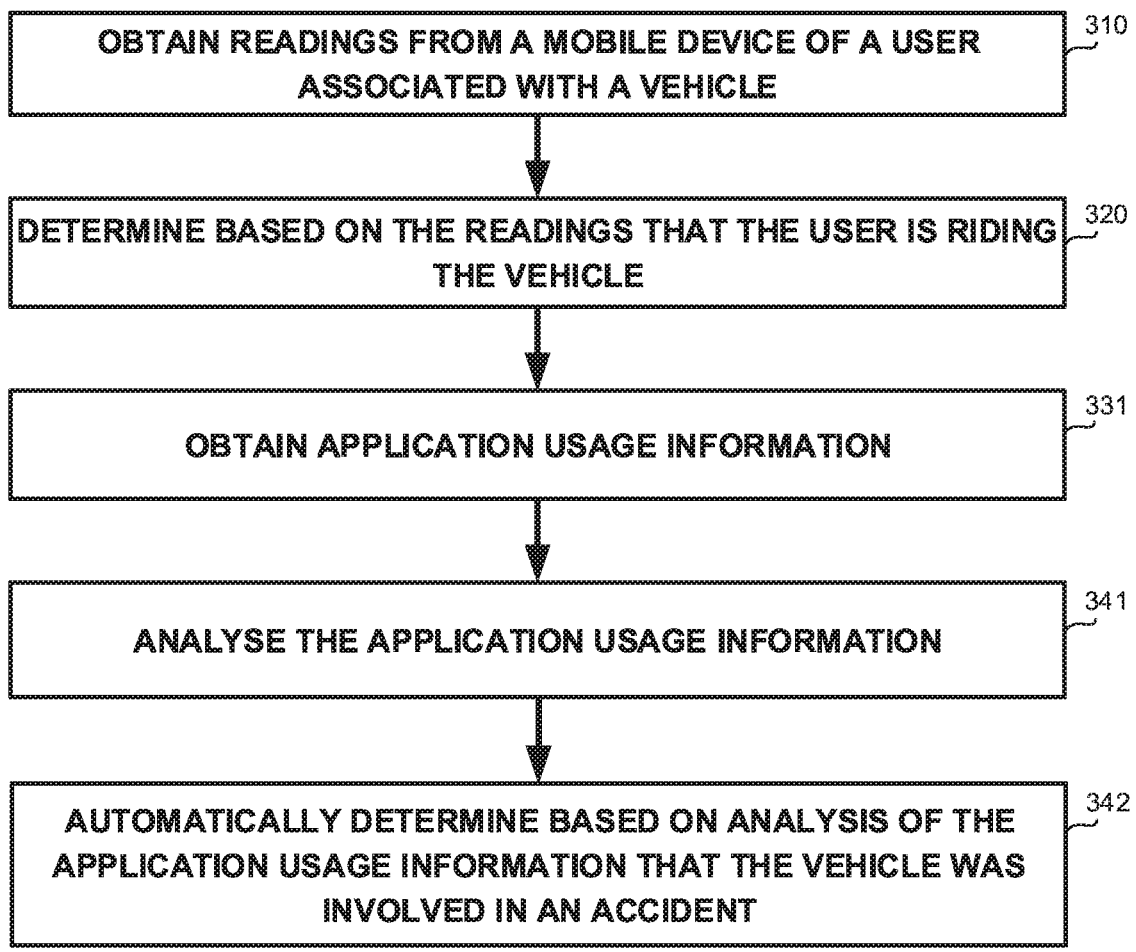

Referring now to FIG. 3B showing a flowchart diagram of a method, in accordance with some exemplary embodiments of the disclosed subject matter.

On Step 331, application usage information may be obtained. In some exemplary embodiments, the data obtained from the mobile device may comprise usage information of applications retained by the mobile device.

On Step 341, the usage information may be analyzed. In some exemplary embodiments, the user may invoke specific applications, in case of being involved in an accident, such as an insurance app, accident reporting app, or the like. Additionally or alternatively, the user may browse specific web pages.

Additionally or alternatively, some applications, background services, or the like, that are installed on the mobile device of the user detect that the user is leaving the vehicle, that the user is walking, the user is injured, or the like.

On Step 342, an involvement of the vehicle in an accident may automatically be determined, based on the analysis of the application usage information.

Figure 3C:
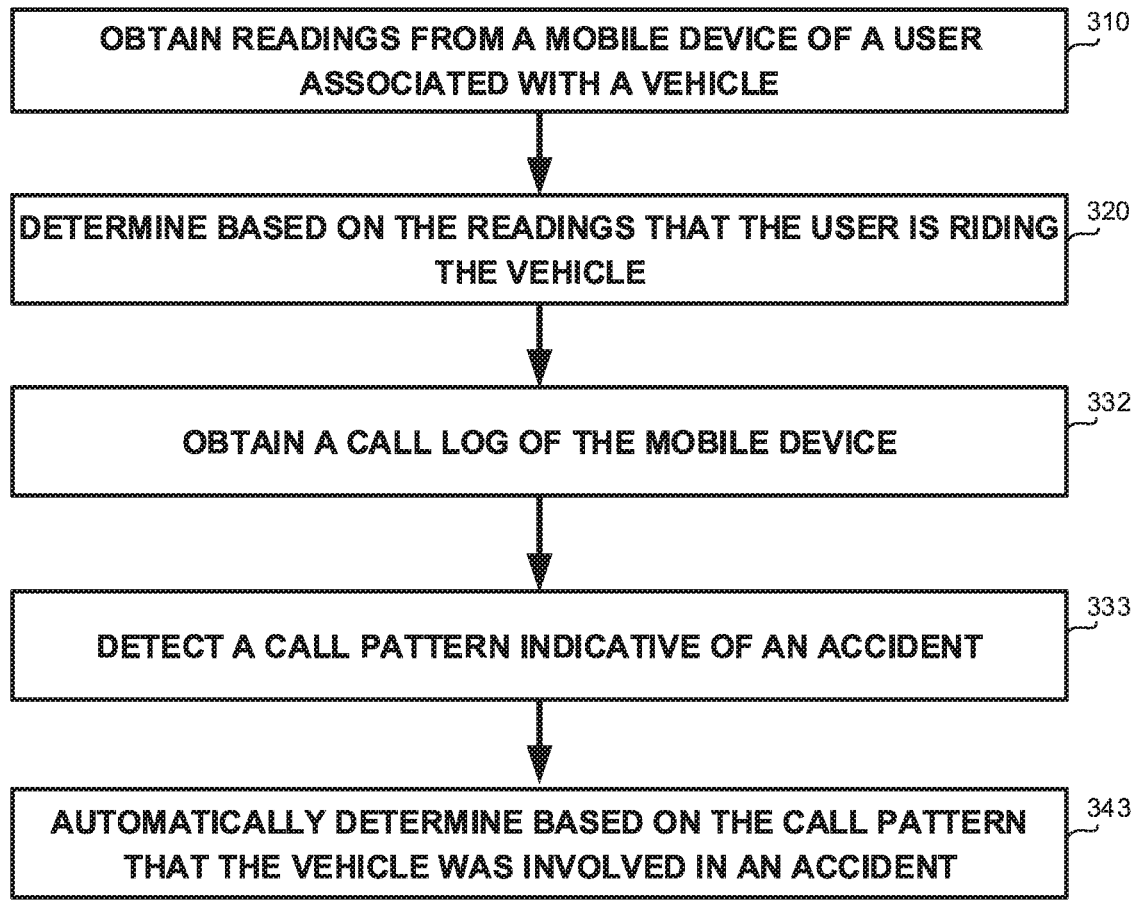

Referring now to FIG. 3C showing a flowchart diagram of a method, in accordance with some exemplary embodiments of the disclosed subject matter.

On Step 332, a call log of the mobile device may be obtained. In some exemplary embodiments, the data obtained from the mobile device may comprise the call log of the mobile device. The call log may be retrieved directly from the mobile device, such as from the call history. Additionally or alternatively, the call log may be obtained by an application of the mobile device providing detailed data about phone call details, such as time, duration, or the like, from a call recorder application, or the like.

On Step 333, a call pattern indicative of an occurrence of an accident may be detected in the call log.

In some exemplary embodiments, the call log may comprise an outgoing call to a phone number of emergency services, an outgoing call to a phone number of an insurance company, or the like. Such an outgoing call may be indicative of an occurrence of an accident, or may be when combined with other data, being be indicative of an occurrence of an accident.

Additionally or alternatively, the call pattern may be a pattern of a plurality of repeated calls to a phone number in a frequency higher than an average call attempt frequency of the user. The plurality of repeated calls to the phone number may be in a frequency higher than an average call attempt frequency of the user to this specific phone number, the general average call attempt frequency of the user to all phone number, or the like. A frequency in the call patter that may be indicative of an occurrence of an accident, may be for example, twice the general average call attempt frequency of the user, three times the average call attempt frequency of the user to this number, ten times the general average call attempt frequency of the user, or the like.

Additionally or alternatively, the call pattern may be a pattern of a plurality of outgoing calls and corresponding incoming calls to and from family members of the user. Such calls may be shorter than usual as being performed to tell family members about the accident, informing that the user is fine, or the like. The duration of the plurality of outgoing calls and corresponding incoming calls may be below an average call duration of the user.

In some exemplary embodiments, the call log may comprise a phone call that was terminated abnormally. Such a phone call may be identified based on having a duration below an average call duration of the user with respect to the other participant of the call. Such a call may also be indicative of an occurrence of an accident.

On Step 343, an involvement of the vehicle in an accident may automatically be determined, based on the call pattern being indicative of the occurrence of the vehicle.

Figure 3D:
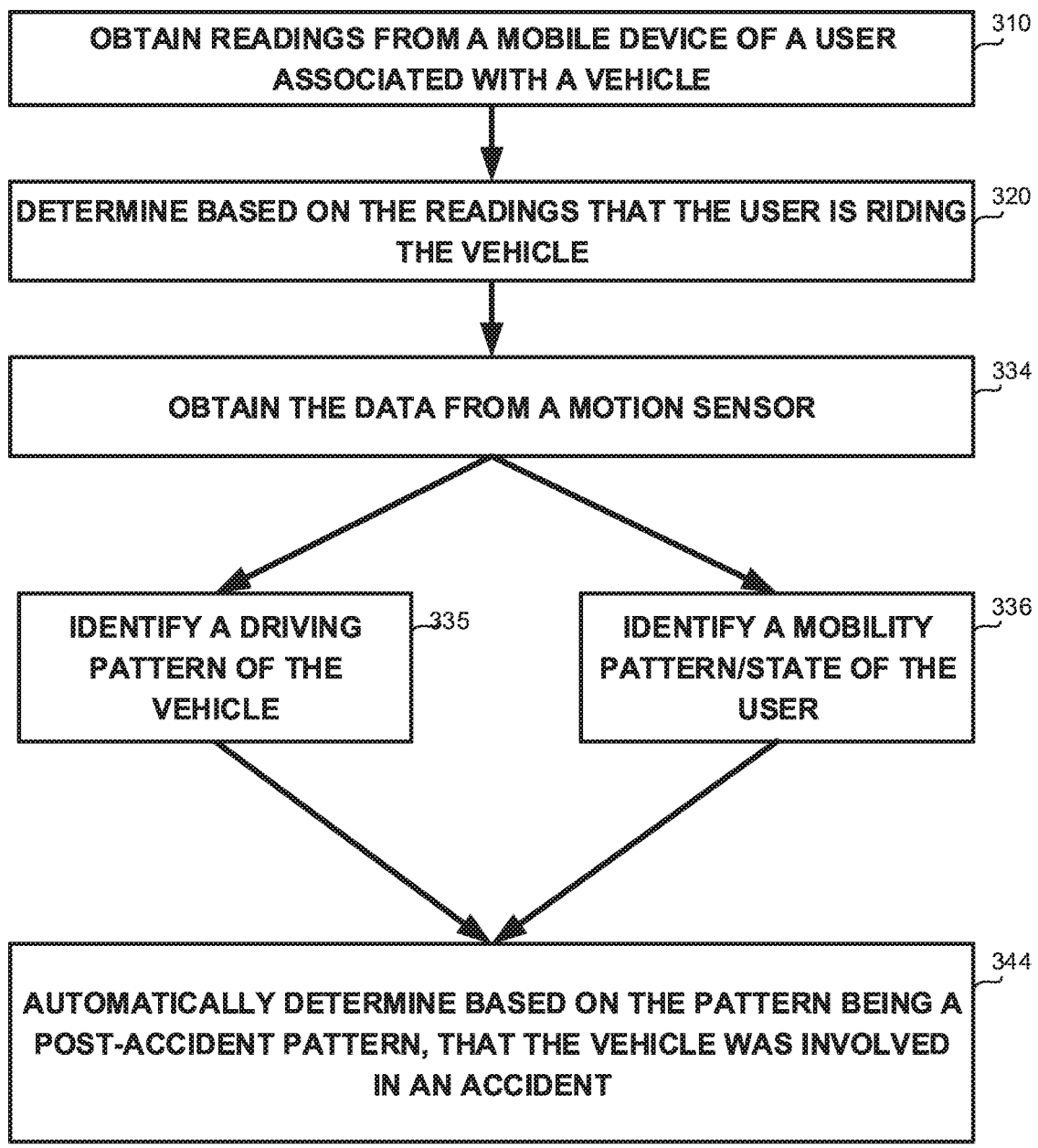

Referring now to FIG. 3D showing a flowchart diagram of a method, in accordance with some exemplary embodiments of the disclosed subject matter.

On Step 334, data from a motion sensor may be obtained. In some exemplary embodiments, the mobile device may comprise one or more sensors capable of sensing motion. As an example, the motion sensor may be an accelerometer. The accelerometer may be configured to enable the mobile device to derive different types of data about the user, such as tracking steps, measure acceleration, switching apps from portrait to landscape, showing current speed, or the like. As another example, the motion sensor may be a gyroscope. The gyroscope may be configured to help the accelerometer detecting the orientation of the computing device, adding another level of precision to turns performed by the mobile device, or the like. As yet another example, the motion sensor may be a magnetometer. The magnetometer may be configured to measure magnetic fields around the mobile device and can thus tell which way is north by varying its voltage output to the mobile device. The magnetometer may be configured to operate in tandem with the data coming from the accelerometer or GPS unit to determine location and point of the user.

On Step 335, a driving pattern of the vehicle may be identified based on the data obtained from the motion sensor. The driving pattern may be consistent with a post-accident driving pattern. As an example, a post-accident driving pattern may comprise driving straight, then driving back for few meters, and then turning to the side and stopping. As another example, a post-accident driving pattern may comprise driving fast then suddenly stopping for a long time. Such movements of the vehicle may be determined based on the data obtained from the one or more motion sensors, such as the accelerometer, the magnetometer, the gyroscope, a combination thereof, or the like. The motion sensors may be configured to sense gravity, linear acceleration, rotation vector, significant motion, step counter, or the like. The exact mobile device movement, such as tilt, shake, rotation, swing, or the like, may be determined. The movement may be a reflection of the physical environment in which the mobile device is being held, such as moving with user while the user drives her vehicle, walking, or the like.

In some exemplary embodiments, the driving pattern may be determined using a combination of statistical characteristics of the accelerometer readings, and other sensors readings. For example, a driving pattern may be classified and distinguished from other activities by detecting constant constraint vibrations occurring while driving compared to abrupt accelerations when walking or running or very low acceleration when the mobile device is not moving. Then, the direction of the driving may be determined based the change of the tilt rotation vector of the mobile device.

Additionally or alternatively, a driving pattern of the vehicle in a road segment that deviates from an average driving pattern of vehicles in the road segment, may be indicative of a vehicle accident. The driving pattern may be detected automatically by analyzing in real time the speed and or locations of vehicles on roads. An example, the driving pattern may be that the vehicle had stopped in a road while other vehicles are driving, that the vehicle had stopped and there is traffic congestion behind it, or the like.

On Step 343, an involvement of the vehicle in an accident may automatically be determined, based on the driving pattern being indicative of the occurrence of the vehicle.

Additionally or alternatively, On Step 336, a mobility pattern or state of the user of the mobile device may be identified based on the data obtained from the motion sensor.

In some exemplary embodiments, a mobility state of the user of the mobile device may be identified based on readings of the motion sensor.

On Step 343, an involvement of the vehicle in an accident may automatically be determined, based on the mobility state of the user being indicative of the occurrence of the vehicle. As an example, a mobility state indicative of the user not riding the vehicle, may be indicative of the user getting off the vehicle as a result of an accident.

Additionally or alternatively, a mobility pattern of the user may be indicative of the user being involved with the accident. The mobility pattern may comprise an ordinal sequence of mobility states of the user. A mobility pattern indicative of an accident may comprise a first mobility state indicative of the user riding a vehicle, a second mobility state, immediately following the first mobility state, indicative of a sudden stop; and a third mobility state occurring after the second mobility state, indicative of a user walking. Such a pattern may be indicative of an accident resulting the sudden stop and forcing the user to get off the vehicle.

Figure 3E:
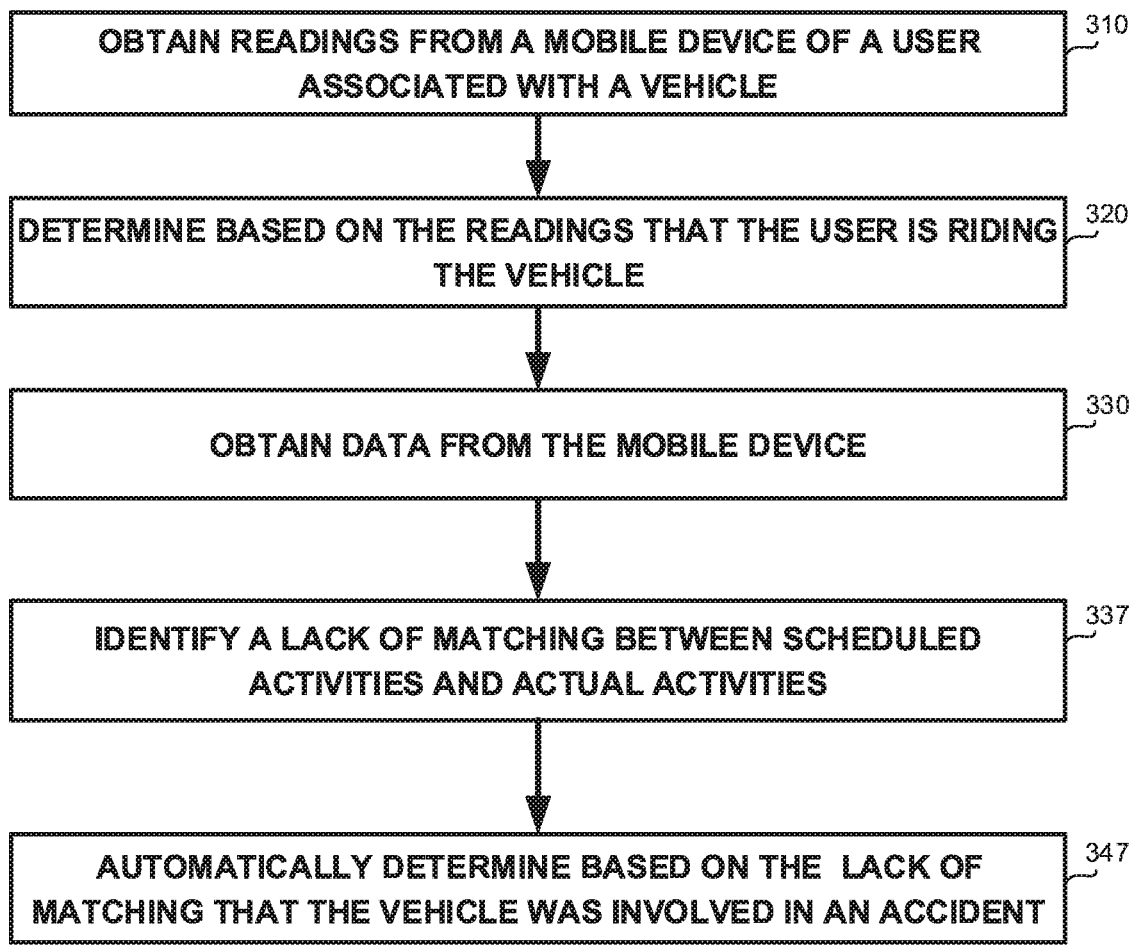

Referring now to FIG. 3E showing a flowchart diagram of a method, in accordance with some exemplary embodiments of the disclosed subject matter.

On Step 330, the data obtained from the mobile device may comprise data from a calendar of the user that is retained in the mobile device. The data may comprise schedule of the user, planned meetings, locations of future plans, or the like.

On Step 337, a lack of matching between scheduled activities of the user, as appearing in the calendar of the user, and actual activities of the user may be identified.

On Step 347, an involvement of the vehicle in an accident may automatically be determined, based on the identified lack of matching. It may be appreciated that in some exemplary embodiments, Step 347 may be performed at least a predetermined time after the accident, such as after one hour, after few hours, after a day, or the like. The determination may be performed in retrospect to the accident.

Figure 3F:
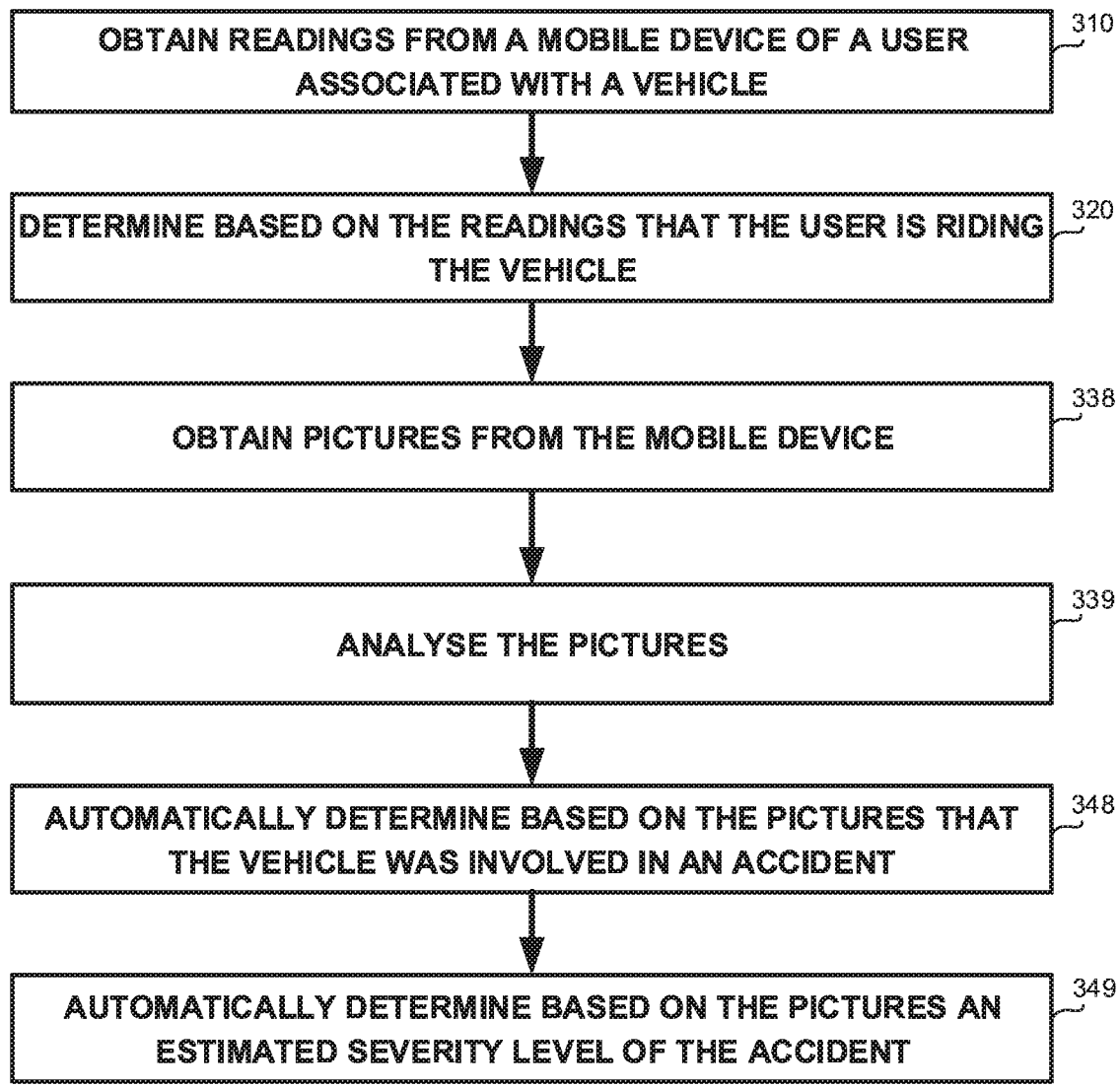

Referring now to FIG. 3F showing a flowchart diagram of a method, in accordance with some exemplary embodiments of the disclosed subject matter.

On Step 338, pictures may be obtained from the mobile device. In some exemplary embodiments, the data obtained from the mobile device may comprise one or more pictures taken by the mobile device, such as pictures captured by a camera of the mobile device, pictures provided by an application of the mobile device, or the like.

On Step 339, the pictures may be analyzed. In some exemplary embodiments, the pictures may be analyzed to identify a damaged vehicle or portion thereof, or any other elements indicative of an accident, such as damaged objects, injured people, or the like. Additionally or alternatively, the pictures may be analyzed to extract information about the accident, vehicles involved in the accident, or the like. As an example, a license plate of a vehicle may be automatically identified in the one or more pictures. Based on the number in the license plate, vehicles involved in the accident may be identified. As another example, the location of the accident may be identified based on the one or more pictures.

On Step 348, an involvement of the vehicle in an accident may automatically be determined, based on the pictures. In some exemplary embodiments, the determination may be performed based on identifying in the one or more pictures a damaged vehicle or portion thereof.

On Step 349, an estimated severity level of the accident may be automatically determined, based on the one or more pictures. In some exemplary embodiments, the severity level may be determined based on the damage identified in the one or more pictures, based on injured people appearing in the one or more pictures, or the like.

In some exemplary embodiments, additional information about the accident, such as the estimated severity level of the accident, involved vehicles, pictures, or the like, may be provided in the report to the third party performed on Step 370.

Figure 3G:
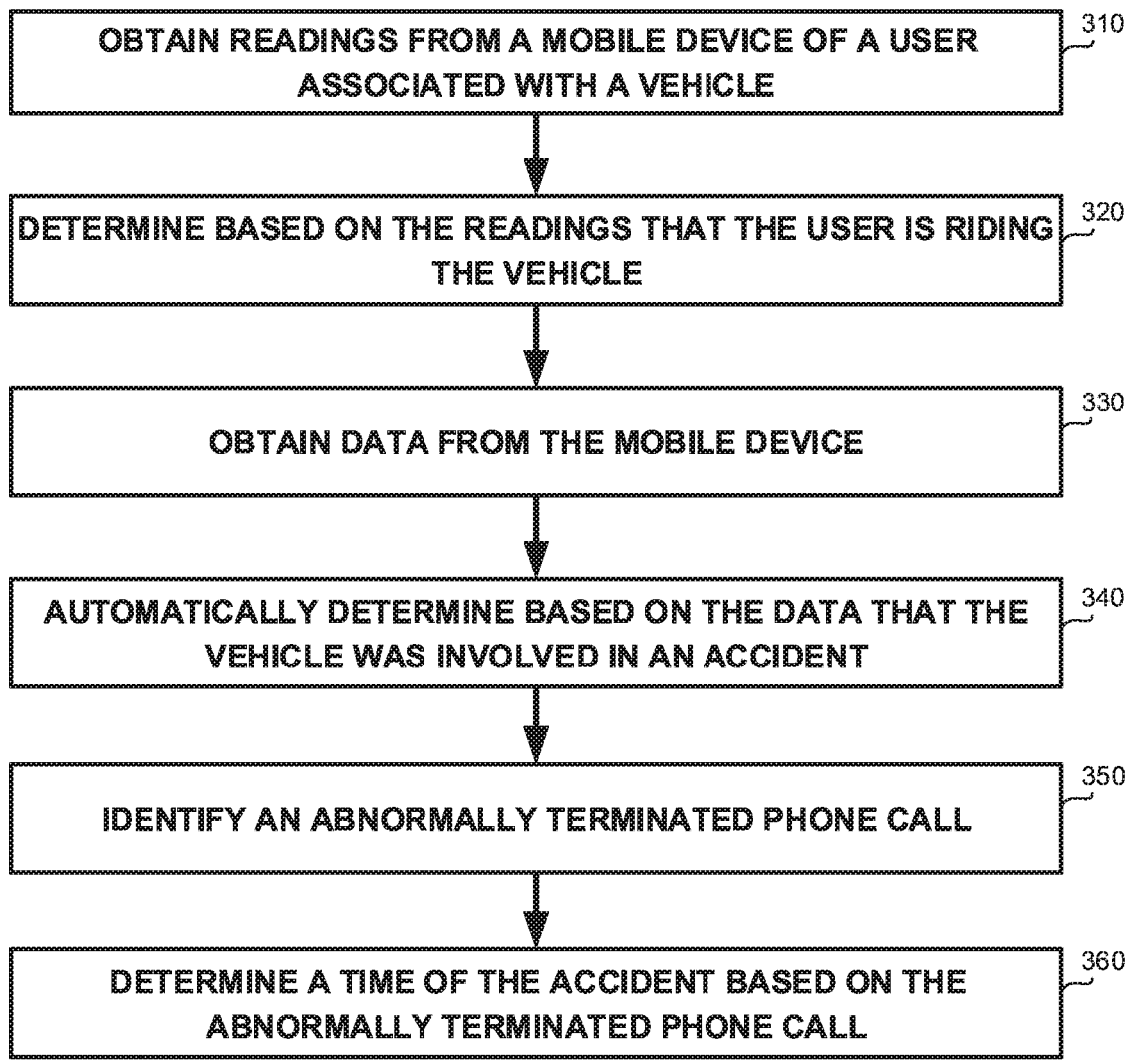

Referring now to FIG. 3G showing a flowchart diagram of a method, in accordance with some exemplary embodiments of the disclosed subject matter.

On Step 350, an abnormally terminated phone call performed using the mobile device may be identified. In some exemplary embodiments, the abnormally terminated call may be identified using a microphone of the mobile device and based on a recording of a last period of the phone call. Additionally or alternatively, the abnormally terminated call may be identified based on identifying a phone call with a participant having a duration below an average call duration of the user with respect to the participant.

On Step 370, a time of the accident may be determined based on a time of a termination of the phone call.

Figure 3H:
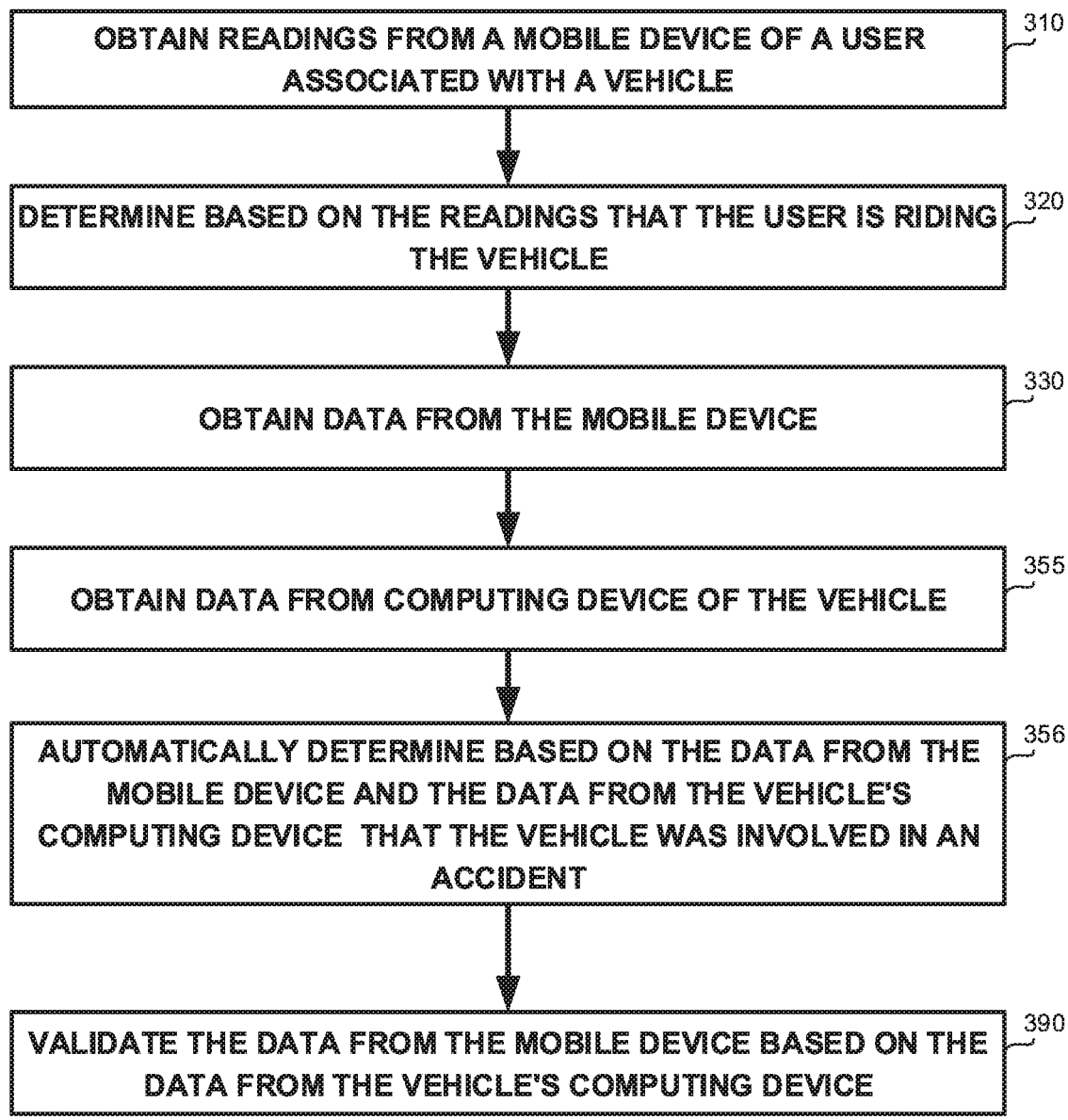

Referring now to FIG. 3H showing a flowchart diagram of a method, in accordance with some exemplary embodiments of the disclosed subject matter.

On Step 355, data from a computing device of the vehicle may be obtained. In some exemplary embodiments, the data obtained from the computing device of the vehicle may comprise one or more pictures captured by a dash camera of the vehicle.

On Step 356, an involvement of the vehicle in an accident may be further determined, based on the data obtained from the computing device. As an example, the involvement of the vehicle in the accident, and other information related thereto, may be performed based on analysis of the one or more pictures captured by the dash camera of the vehicle.

On Step 390, the data obtained from the mobile device may be validated based on the data obtained from the vehicle's computing device.

Figure 4:
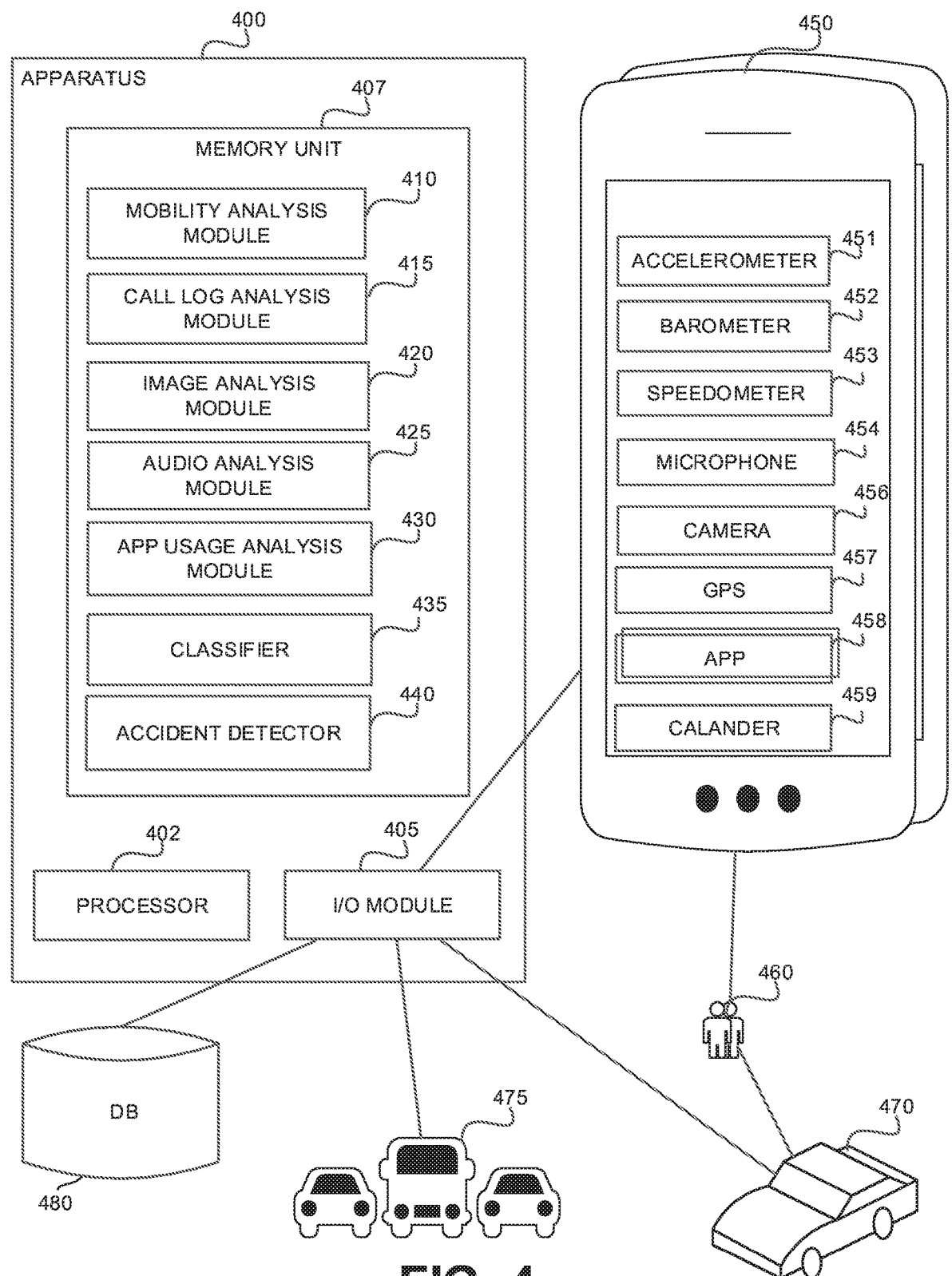
FIG. 4 shows a block diagram of an apparatus, in accordance with some exemplary embodiments of the disclosed subject matter.

Referring now to FIG. 4 showing a block diagram of an apparatus, in accordance with some exemplary embodiments of the disclosed subject matter. An Apparatus 400 may be configured to support parallel user interaction with a real world physical system and a digital representation thereof, in accordance with the disclosed subject matter.

In some exemplary embodiments, Apparatus 400 may comprise one or more Processor(s) 402. Processor 402 may be a Central Processing Unit (CPU), a microprocessor, an electronic circuit, an Integrated Circuit (IC) or the like. Processor 402 may be utilized to perform computations required by Apparatus 400 or any of it subcomponents.

In some exemplary embodiments of the disclosed subject matter, Apparatus 400 may comprise an Input/Output (I/O) module 405. I/O Module 405 may be utilized to provide an output to and receive input from other computing devices, such as, for example Mobile Device 450, computing devices of Vehicles 475, mobile devices carried by users riding Vehicles 475, or the like.

In some exemplary embodiments, Apparatus 400 may comprise Memory 407. Memory 407 may be a hard disk drive, a Flash disk, a Random Access Memory (RAM), a memory chip, or the like. In some exemplary embodiments, Memory 407 may retain program code operative to cause Processor 402 to perform acts associated with any of the subcomponents of Apparatus 400.

In some exemplary embodiments, Apparatus 400 may be configured to analyses the data obtained from the one or more Mobile Device 450, and determine, based thereon, that Vehicle 470 was involved in an accident.

In some exemplary embodiments, Apparatus 400 may be configured to obtain via I/O Module 405 readings from one or more Mobile Device(s) 450. Mobile Device 450(s) may be carried by one or more User(s) 460. One or more User(s) 460 may be riding in a Vehicle 470, such as a driver, passengers, or the like. Mobile Device 450 may not be affixed to Vehicle 470, rather may be temporary associated therewith.

In some exemplary embodiments, some of the readings obtained from Mobile Device 450 may be accelerometer readings of An Accelerometer 451 of Mobile Device 450. Mobility Analysis Module 410 may be configured to determine, based on the readings obtained from Mobile Device 450, that User 460 is riding in Vehicle 470. Mobility Analysis Module 410 may be configured to analyze the readings obtained from Mobile Device 450, such as Accelerometer 451 readings, to determine mobility state of User 460. The mobility state may be standing, walking, running, riding a bicycle, riding a car in a slow road, riding a car in a highway, or the like. Apparatus 400 may be configured to determine that User 460 is riding Vehicle 470 based on the mobility state of User 460. It may be appreciated that the results may be validated or supported based on data from other sensors of Mobile Device 450 or Vehicle 470.

In some exemplary embodiments, Mobility Analysis Module 410 may be configured to identify, based on the readings of Accelerometer 451, a driving pattern of Vehicle 470 that is consistent with a post-accident driving pattern, such as a sudden stop after a fast driving, or the like. Mobility Analysis Module 410 may utilize additional data obtained from other sensors od Mobile Device 450 that are capable of sensing motion, such as Barometer 452, Speedometer 453, or the like, to identify the driving pattern. Mobility Analysis Module 410 may be configured to analyze such data to determine the speed, direction, acceleration, or the like, of Vehicle 470. Accident Detector 440 may be configured to determine that Vehicle 470 was involved in an accident, based on the driving pattern of Vehicle 470 being consistent with a post-accident driving pattern. Additionally or alternatively, Mobility Analysis Module 410 may be configured to identify, based on the data obtained from the motion sensors, a driving pattern of Vehicle 470 in a road segment that deviates from an average driving pattern of other vehicles, such as Vehicle 475, in the road segment. As an example, Vehicle 470 may stop in the middle of the road, while the other vehicles continue to drive, Vehicle 470 may be stopping while the other vehicles slowing down when passing besides Vehicle 470 an d returning to their previous speed when being after Vehicle 470. Accident Detector 440 may be configured to determine that Vehicle 470 was involved in an accident, based on the driving pattern of Vehicle 470 being different than the driving pattern of the other vehicles in the same road segment.

Additionally or alternatively, Mobility Analysis Module 410 may be configured to identify, based on the data obtained from the motion sensors, a mobility state of User 460. Accident Detector 440 may be configured to determine that Vehicle 470 was involved in an accident, based on the mobility state of User 460 being indicative of User 460 not riding Vehicle 470. Determining that User 460 not riding Vehicle 470, after already determining that User 460 was riding Vehicle 470, and the Vehicle 470 is in a middle of a planned drive, or in the middle of a road, or the like, may be an indication that User 460 had to get off Vehicle 470 because of an emergency event, such as an accident.

Additionally or alternatively, Mobility Analysis Module 410 may be configured to identify, based on the data obtained from the motion sensors, a mobility pattern of User 460 that is indicative of User 460 being involved with the accident. The mobility pattern may comprise an ordinal sequence of mobility states of User 460, indicative of User 460 being involved with the accident. As an example, the mobility pattern may comprise a sequence of a first mobility state indicative of User 460 riding a vehicle, a second mobility state, immediately following the first mobility state, indicative of a sudden stop; and a third mobility state occurring after the second mobility state, indicative of User 460 walking. Such a mobility pattern may be indicative of Vehicle 470 being involved in an accident, as User 460 riding Vehicle 470, may be in a state of a sudden stop when the accident occurs, and may get off Vehicle 470 and walk to check what happened to Vehicle 470.

In some exemplary embodiments, Accident Detector 440 may be configured to determine that Vehicle 470 was involved in an accident at least a predetermined time after the accident, such as after an hour, after few hours, at the end of the day, the next day, or the like. Accident Detector 440 may be configured to determine that Vehicle 470 was involved in an accident based on a lack of matching between scheduled activities of User 460, as appearing in a Calendar 459 of User 460 that is retained in Mobile Device 450, and actual activities of User 460. The actual activities of User 460 may be determined based on data obtained from Apps installed on Mobile Device 450, based on data obtained from other sensors of Mobile Device 450, based on location data obtained from a GPS Sensor 457 of Device 450, or the like.

In some exemplary embodiments, the data obtained from Mobile Device 450 may comprise a call log of Mobile Device 450. Call Log Analysis Module 415 may be configured to analyze the call log of Mobile Device 450 to detect a call pattern in a call log indicative of an occurrence of an accident. The call pattern may be an outgoing call to a phone number of emergency services, an outgoing call to a phone number of an insurance company, a plurality of repeated calls to a phone number in a frequency higher than an average call attempt frequency of the user, a plurality of outgoing calls and corresponding incoming calls to and from family members of the user, with a duration of the plurality of outgoing calls and corresponding incoming calls being below an average call duration of the user, or the like. Accident Detector 440 may be configured to determine that Vehicle 470 was involved in an accident based on the call pattern being indicative of an occurrence of an accident.

Additionally or alternatively, Call Log Analysis Module 415 may be configured to identify, in the call log of Mobile Device 450, a phone call performed using the mobile device that was terminated abnormally. As an example, Call Log Analysis Module 415 may be configured to identify a phone call with a participant having a duration below an average call duration of the user with respect to the participant. As another example, Call Log Analysis Module 415 may be configured to analyze some of the last phone calls, or recordings thereof, to determine that a phone call was terminated in a different manner than usual, that a phone call has been terminated abnormally and there was no complementary phone call thereto, that a phone call has been terminated abnormally and there was a complementary phone call thereto (e.g., for telling about the accident), or the like. Additionally or alternatively, Call Log Analysis Module 415 may be configured to analyze a recording of a last period of a last phone call to determine that such a phone call was terminated abnormally. The recording may be obtained from a Microphone 454 of Mobile Device 450 via I/O Module 405. Accident Detector 440 may be configured to determine a time of the accident based on a time of a termination of the phone call. In some cases, the precise timing may not be known. GPS and location information obtained from Mobile Device 450 may be used to determine when User 460 was located at or near the place of the accident, and anomaly detection may be used to identify the timeframe in which User 460 acted abnormally to identify when exactly the accident occurred.

In some exemplary embodiments, pictures taken by Mobile Device 450, such as by Camera 456, by Apps 458, or the like, may be obtained via I/O Module 405. Image Analysis Module 420 may be configured to analyze the pictures in order to identify elements or motifs indicative of an accident, such as a damaged vehicle, a portion of a damaged vehicle, injured people, crash, or the like. Additionally or alternatively, Accident Detector 440 may be configured to determine that Vehicle 470 was involved in an accident based on pictures being indicative thereof. Additionally or alternatively, Image Analysis Module 420 may be configured to analyze the pictures in order to extract additional information about the accident. As an example, Image Analysis Module 420 may be configured to identify a license plate of a vehicle in the pictures, other identifiers of vehicles, or the like. Accident Detector 440 may be configured to determine, based on analysis of the pictures performed by Image Analysis Module 420, an estimated severity level of the accident, information about vehicles involved in the accident, or the like.

In some exemplary embodiments, the data obtained from Mobile Device 450 may comprise recordings from a Microphone 454 of Mobile Device 450. Audio Analysis Module 425 may be configured to analyze the recordings in order to identify an audio segment indicative of an accident, such as a voice of a crash, a screaming, or the like. Accident Detector 440 may be configured to determine that Vehicle 470 was involved in an accident based on the recordings comprising an audio segment indicative of an accident.

In some exemplary embodiments, the data obtained from Mobile Device 450 may comprise a usage information of a plurality of applications of Mobile Device 450, such as Apps 458. App Usage Analysis Module 430 may be configured to analyze the usage information of the plurality of applications to determine an indication of an accident, such as using an insurance application, using an auto filling car accident report application, or the like. Accident Detector 440 may be configured to determine that Vehicle 470 was involved in an accident based on the usage information being indicative of an accident.

In some exemplary embodiments, Apparatus 400 may be configured to obtain via I/O Module 405 data from a computing device of Vehicle 470. The computing device may be capable of sensing the environment of Vehicle 470, based on a variety of sensors of Vehicle 470, such as radars, computer vision, Lidar, sonar, GPS, odometer, inertial measurement units, or the like. In some exemplary embodiments, the data may comprise one or more pictures captured by a dash camera of Vehicle 470. Image Analysis Module may be configured to analyze the one or more pictures in order to determine that Vehicle 470 was involved in an accident, to extract additional information about the accident, or the like.

In some exemplary embodiments, Accident Detector 440 may be configured to extract a feature vector from the data obtained from Mobile Device 450. The feature vector may be extracted from the data obtained from the various sensors and sources of Mobile Device 450, computing devices of Vehicle 470 or Vehicles 475, other mobile devices, or the like. The feature vector may represent sensor readings in a sliding window with respect to some of the sensors, such as readings of last one minute of Accelerometer 451, pictures captured in the last 5 minutes, or the like. Additionally or alternatively, the feature vector may represent a true/false indication of an event, e.g., a loud sound was heard in the last 60 minutes, a picture of a damaged vehicle was captured in the last 10 minutes, or the like. In some exemplary embodiments, a reading of the same sensor may be provided to different time windows which may or may not overlap. For example, accelerometer information may be provided for 10 windows, 20 windows, 60 windows, or the like, each of which of 10 seconds, 20 seconds, or the like.

In some exemplary embodiments, the feature vector may be used with a Classifier 435. Classifier 435 may be utilized to predict a label for the feature vector, such as a label of accident occurred or no accident occurred, a label representing the severity level of the accident, or the like. In some exemplary embodiments, Classifier 435 may be trained using training data. Classifier 435 may be a global model based on behavior of many people, an individual model of an individual person behavior representing User 4650, or the like. In some exemplary embodiments, a cluster of users may be compiled, and for each cluster a model may be trained, thereby providing a model useful for "look-a-like" users that behave in a similar manner.

In some exemplary embodiments, The training data may be obtained from Database 480 and may comprise pairs of data pieces and labels thereof, pairs of features and labels thereof, pairs of vector values and labels thereof, or the like. The training data may be obtained using data on accidents from third party sources, such as incidents information services like Waze™, Google™ maps, or the like. Additionally or alternatively, The training data may be obtained using information from service providers such as insurance companies, car manufacturers call centers, or the like. The data may be used to obtain a label and correlate the label with a feature vector that is obtained from the third party source or obtained using an agent installed on Apparatus 400. For example, an agent, e.g. Accident Detector 440, may monitor behavior of User 460 and the information about the accident may be obtained from the insurance company of User 460. Using such information, the behavior of User 460 at the time of the accident may be obtained from the agent's log.

In some exemplary embodiments, Apparats 400 may be configured to issue, via I/O module, a report of the accident to a third party, such as to emergency services, insurance agent, or the like. Additionally or alternatively, the report may be provided to instances of Mobile Device 450, such as to a message application sending the report to contacts of Mobile Device 450, to Calendar 459, to social network Apps 458, or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   obtaining readings from a mobile device of a user, wherein the mobile device is being carried by the user, wherein the user is riding in a vehicle, wherein the mobile device is not affixed to the vehicle;
   determining, based on the readings obtained from the mobile device, that the user is riding in the vehicle;
   identifying a phone call performed using the mobile device that was terminated abnormally, and
   determining automatically that the vehicle was involved in an accident, wherein said determining comprises determining a time of the accident based on a time of a termination of the phone call.

2. The method of claim 1, wherein said identifying the phone call is performed using a microphone of the mobile device and based on a recording of a last period of the phone call.

3. The method of claim 1, wherein said identifying the phone call is performed based on a call log of the mobile device, wherein said identifying comprises identifying a phone call with a participant having a duration below an average call duration of the user with respect to the participant.

4. The method of claim 1 further comprises, in response to said determining automatically that the vehicle was involved in an accident, automatically reporting the accident to a third party.

5. The method of claim 1 further comprises, in response to said determining automatically that the vehicle was involved in an accident, automatically updating a calendar of the user, wherein the calendar is retained in the mobile device.

6. A method comprising:
obtaining readings from a mobile device of a user, wherein the mobile device is being earned by the user, wherein the user is riding in a vehicle, wherein the mobile device is not affixed to the vehicle, wherein the mobile device comprises a sensor capable of sensing motion;
determining, based on the readings obtained from the mobile device, that the user is riding in the vehicle;
obtaining data from the mobile device of the user; and
determining automatically, based on the data obtained from the mobile device, that the vehicle was involved in an accident, wherein said determining automatically that the vehicle was involved in an accident comprises:
identifying a in mobility pattern of the user comprising an ordinal sequence of mobility states of the user, wherein the mobility pattern is indicative of the user being involved with the accident, wherein the mobility pattern comprises at least a sequence of a first mobility state indicative of the user riding a vehicle, a second mobility state, immediately following the first mobility state, indicative of a sudden stop; and a third mobility state occurring after the second mobility state, indicative of a user walking.

7. The method of claim 6, wherein the mobile device comprising an accelerometer, wherein said obtaining the readings comprises obtaining accelerometer readings from the accelerometer, wherein said determining that the user is riding in the vehicle comprises analyzing the accelerometer readings of the mobile device to determine mobility states of the user.

8. The method of claim 6 further comprises, in response to said determining automatically that the vehicle was involved in an accident, automatically reporting the accident to a third party.

9. The method of claim 6 further comprises, in response to said determining automatically that the vehicle was involved in an accident, automatically updating a calendar of the user, wherein the calendar is retained in the mobile device.

10. A method comprising:
obtaining readings from a mobile device of a user, wherein the mobile device is being carried by the user, wherein the user is riding in a vehicle, wherein the mobile device is not affixed to the vehicle;
determining, based on the readings obtained from the mobile device, that the user is riding in the vehicle;
obtaining data from the mobile device of the user; and
determining automatically, based on the data obtained from the mobile device, that the vehicle was involved in an accident, wherein said determining automatically that the vehicle was involved in an accident is performed at least a predetermined time after the accident, wherein said determining is performed based on a lack of matching between scheduled activities of the user, as appearing in a calendar of the user that is retained in the mobile device, and actual activities of the user.

11. The method of claim 10 further comprises, in response to said determining automatically that the vehicle was involved in an accident, automatically reporting the accident to a third party.

12. The method of claim 10 further comprises, in response to said determining automatically that the vehicle was involved in an accident, automatically updating a calendar of the user, wherein the calendar is retained in the mobile device.

13. A non-transitory computer readable medium retaining program instructions, which program instructions when read by a processor, cause the processor to perform:
obtaining readings from a mobile device of a user, wherein the mobile device is being carried by the user, wherein the user is riding in a vehicle, wherein the mobile device is not affixed to the vehicle;
determining, based on the readings obtained from the mobile device, that the user is riding in the vehicle;
identifying a phone call performed using the mobile device what was terminated abnormally; and
determining automatically that the vehicle was involved in an accident, wherein said determining comprises determining a time of the accident based on a time of a termination of the phone call.

14. An apparatus comprising: a processor and a memory, wherein the memory retaining said non-transitory computer readable medium of claim 13.

15. A non-transitory computer readable medium retaining program instructions, which program instructions when read by a processor, cause the processor to perform:
obtaining readings from a mobile device of a user, wherein the mobile device is being carried by the user, wherein the user is riding in a vehicle, wherein the mobile device is not affixed to the vehicle, wherein the mobile device comprises a sensor capable of sensing motion;
determining, based on the readings obtained from the mobile device, that the user is riding in the vehicle;
obtaining data from the mobile device of the user; and
determining automatically, based on the data obtained from the mobile device, that the vehicle was involved in an accident, wherein said determining automatically that the vehicle was involved in an accident comprises:
identifying a mobility pattern of the user comprising an ordinal sequence of mobility states of the user, wherein the mobility pattern is indicative of the user being involved with the accident, wherein the mobility pattern comprises at least a sequence of a first mobility state indicative of the user riding a vehicle, a second mobility state, immediately following the first mobility state, indicative of a sudden stop; and a third mobility state occurring after the second mobility state, indicative of a user walking.

16. An apparatus comprising: a processor and a memory, wherein the memory retaining said non-transitory computer readable medium of claim 15.

17. A non-transitory computer readable medium retaining program instructions, which program instructions when read by a processor, cause the processor to perform:
obtaining readings from a mobile device of a user, wherein the mobile device is being carried by the user, wherein the user is riding in a vehicle, wherein the mobile device is not affixed to the vehicle;

determining, based on the readings obtained from the mobile device, that the user is riding in the vehicle;

obtaining data from the mobile device of the user; and determining automatically, based on the data obtained from the mobile device, that the vehicle was involved in an accident, wherein said determining automatically that the vehicle was involved in an accident is performed at least a predetermined time after the accident, wherein said determining is performed based on a lack of matching between scheduled activities of the user, as appearing in a calendar of the user that is retained in the mobile device, and actual activities of the user.

18. An apparatus comprising: a processor and a memory, wherein the memory retaining said non-transitory computer readable medium of claim 17.

* * * * *